United States Patent
Nordby et al.

(10) Patent No.: US 12,474,737 B2
(45) Date of Patent: Nov. 18, 2025

(54) DEVICE MOUNT FOR SUPPORTING A COMPUTING DEVICE

(71) Applicant: reMarkable AS, Oslo (NO)

(72) Inventors: Gaute Wiig Nordby, Oslo (NO); Borge Strand-Bergesen, Hvalstad (NO); Erik Andre Bengtsson, Oslo (NO); Vegard Bakke Svendsen, Oslo (NO)

(73) Assignee: reMarkable AS, Oslo (NO)

( * ) Notice: Subject to any disclaimer, the term of this patent is extended or adjusted under 35 U.S.C. 154(b) by 265 days.

(21) Appl. No.: 17/985,754

(22) Filed: Nov. 11, 2022

(65) Prior Publication Data
US 2023/0152861 A1    May 18, 2023

Related U.S. Application Data

(60) Provisional application No. 63/278,548, filed on Nov. 12, 2021.

(51) Int. Cl.
*G06F 1/16* (2006.01)
*H01R 13/22* (2006.01)

(52) U.S. Cl.
CPC .......... *G06F 1/1632* (2013.01); *G06F 1/1607* (2013.01); *G06F 1/166* (2013.01); *G06F 1/1681* (2013.01); *H01R 13/22* (2013.01)

(58) Field of Classification Search
CPC ...... G06F 1/1632; G06F 1/1607; G06F 1/166; G06F 1/1681; H01R 13/22
See application file for complete search history.

(56) References Cited

U.S. PATENT DOCUMENTS 6,064,765 A    5/2000  Hirayama
6,151,206 A   11/2000  Kato et al.
(Continued)

FOREIGN PATENT DOCUMENTS

CN       104142705 A     11/2014
DE    202013101011 U1     5/2013
(Continued)

OTHER PUBLICATIONS

A publication regarding the Aspire Switch 10 ("Acer") published on Aug. 1, 2014.
(Continued)

*Primary Examiner* — Allen L Parker
*Assistant Examiner* — Elisa Sasserath
(74) *Attorney, Agent, or Firm* — Fenwick & West LLP

(57) ABSTRACT

One embodiment of a device mount orients a display device. The device mount comprises a backplate with a first surface for removably coupling the display device and a bottom plate having a first surface coupling an input mechanism. An upper support panel couples to a second surface of the backplate and the bottom plate. The upper support panel rotates about a first hinge and a second hinge to support the backplate as the backplate is raised relative to the bottom plate. A lower support panel couples to a second surface of the backplate and the bottom plate. As the backplate is raised relative to the bottom plate, the lower support panel rotates about a third hinge and a fourth hinge and the backplate rotates about the third hinge away from a first face of the lower support panel to rest against a second face of the lower support panel.

20 Claims, 14 Drawing Sheets

Device Mount
300

(56) References Cited

U.S. PATENT DOCUMENTS

| | | |
|---|---|---|
| 7,145,092 B2 | 12/2006 | Tuhkala |
| 7,239,505 B2 | 7/2007 | Keely et al. |
| 7,461,444 B2 | 12/2008 | Deaett et al. |
| 7,722,358 B2 | 5/2010 | Chatterjee et al. |
| 7,941,191 B2 | 5/2011 | Hanssen et al. |
| 8,022,307 B2 | 9/2011 | Chu et al. |
| 8,143,983 B1 | 3/2012 | Lauder et al. |
| D671,114 S | 11/2012 | Akana |
| 8,498,100 B1 | 7/2013 | Whitt et al. |
| D692,886 S | 11/2013 | Bates |
| D701,205 S | 3/2014 | Akana |
| 8,688,037 B2 | 4/2014 | Chatterjee et al. |
| D704,702 S | 5/2014 | Akana |
| 8,724,302 B2 | 5/2014 | Whitt et al. |
| 8,780,541 B2 | 7/2014 | Whitt et al. |
| 8,817,457 B1 | 8/2014 | Colby et al. |
| 8,873,227 B2 | 10/2014 | Whitt et al. |
| 8,947,864 B2 | 2/2015 | Whitt et al. |
| 8,947,868 B2 | 2/2015 | Motoishi et al. |
| 8,964,379 B2 | 2/2015 | Rihn |
| 9,017,092 B1 | 4/2015 | McCracken |
| 9,146,620 B2 | 9/2015 | Whitt et al. |
| 9,149,100 B2 | 10/2015 | Marshall |
| 9,218,025 B2 | 12/2015 | Bates |
| 9,244,535 B2 | 1/2016 | Bates |
| 9,280,181 B2 | 3/2016 | Tomita et al. |
| 9,335,793 B2 | 5/2016 | Rothkopf |
| 9,390,869 B2 | 7/2016 | Lee |
| 9,436,229 B2 | 9/2016 | Yoo |
| 9,442,518 B2 | 9/2016 | Siddiqui |
| 9,443,673 B2 | 9/2016 | Chu |
| 9,451,822 B2 | 9/2016 | Gu |
| 9,494,976 B2 | 11/2016 | Bates |
| 9,494,977 B2 | 11/2016 | Spollen |
| 9,496,102 B2 | 11/2016 | Bates |
| D773,454 S | 12/2016 | Akana |
| D776,116 S | 1/2017 | Akana |
| 9,532,631 B2 | 1/2017 | Gu |
| 9,552,014 B2 | 1/2017 | Tomita |
| D779,485 S | 2/2017 | Akana |
| 9,575,515 B2 | 2/2017 | Leon |
| 9,588,551 B1 | 3/2017 | Hegde |
| 9,621,214 B2 | 4/2017 | Paek |
| 9,632,602 B2 | 4/2017 | Marwah |
| 9,678,542 B2 | 6/2017 | Whitt et al. |
| D792,393 S | 7/2017 | Akana |
| 9,705,242 B1 | 7/2017 | Heiskanen |
| 9,705,243 B1 | 7/2017 | McCracken |
| 9,715,251 B2 | 7/2017 | Chung |
| 9,720,453 B2 | 8/2017 | Nelson |
| 9,728,915 B2 | 8/2017 | Aldehayyat |
| 9,760,183 B2 | 9/2017 | Kawaguchi |
| 9,762,279 B2 | 9/2017 | Lee |
| 9,769,293 B2 | 9/2017 | Gu |
| 9,778,705 B2 | 10/2017 | Esmaeili |
| 9,785,193 B2 | 10/2017 | Sano |
| 9,823,093 B2 | 11/2017 | Kauhaniemi |
| 9,823,704 B2 * | 11/2017 | Armstrong ............ G06F 1/1669 |
| 9,840,861 B1 | 12/2017 | Maatta |
| 9,851,759 B2 | 12/2017 | Tazbaz |
| 9,883,583 B2 | 1/2018 | Cousins |
| 9,893,452 B2 | 2/2018 | Wagman |
| 9,904,327 B2 | 2/2018 | Whitt et al. |
| 9,904,373 B2 | 2/2018 | Shirata |
| 9,930,773 B2 | 3/2018 | Holbery |
| 9,946,295 B2 | 4/2018 | Smith |
| 9,946,296 B2 | 4/2018 | Smith |
| 9,952,623 B2 | 4/2018 | Tomita |
| D819,038 S * | 5/2018 | Diebel ............ D14/440 |
| 9,965,000 B2 | 5/2018 | Koppal |
| 9,977,460 B2 | 5/2018 | Wagman |
| D820,838 S | 6/2018 | Akana |
| D820,839 S | 6/2018 | Akana |
| D820,840 S | 6/2018 | Akana |
| D820,841 S | 6/2018 | Akana |
| 9,997,305 B2 | 6/2018 | Wang |
| 9,997,308 B2 | 6/2018 | Leong |
| 9,998,166 B2 | 6/2018 | Kim |
| 10,013,030 B2 | 7/2018 | Whitt et al. |
| 10,050,368 B2 | 8/2018 | Wagman |
| 10,056,205 B2 | 8/2018 | Hegde |
| 10,061,359 B2 | 8/2018 | Maatta |
| 10,082,840 B2 | 9/2018 | Esmaeili |
| 10,082,913 B2 | 9/2018 | Moller |
| 10,090,121 B2 | 10/2018 | Winter |
| D832,836 S | 11/2018 | Akana |
| 10,153,577 B2 | 12/2018 | Wagman |
| 10,175,782 B2 | 1/2019 | Katsuhara |
| 10,257,950 B2 | 4/2019 | Määttä |
| 10,289,210 B1 | 5/2019 | Wang |
| 10,303,209 B2 | 5/2019 | Smith |
| 10,303,215 B2 | 5/2019 | Corbin |
| 10,317,953 B2 | 6/2019 | Esmaeili |
| 10,345,916 B2 | 7/2019 | Gu |
| 10,353,485 B1 | 7/2019 | Zhang |
| 10,362,670 B2 | 7/2019 | Cousins |
| 10,372,159 B2 | 8/2019 | Kim |
| 10,418,741 B2 | 9/2019 | Wagman |
| 10,466,804 B2 | 11/2019 | Murphy |
| 10,468,211 B2 | 11/2019 | Leong |
| 10,474,199 B2 | 11/2019 | Longo |
| 10,481,746 B2 | 11/2019 | Moller |
| 10,483,688 B2 | 11/2019 | Wrisley |
| 10,520,127 B2 | 12/2019 | Dearsley |
| 10,551,878 B2 | 2/2020 | Longo |
| 10,566,151 B1 | 2/2020 | Wang |
| 10,579,097 B2 | 3/2020 | Wagman |
| 10,590,600 B1 | 3/2020 | Wang |
| 10,635,186 B1 | 4/2020 | Wang |
| 10,672,548 B2 | 6/2020 | Srinivasan |
| 10,683,591 B1 | 6/2020 | Podhajny |
| 10,732,728 B1 | 8/2020 | Sunshine |
| 10,739,825 B2 | 8/2020 | Gilbert |
| 10,754,393 B2 | 8/2020 | Campbell |
| 10,890,954 B2 | 1/2021 | Evans |
| 10,908,652 B2 | 2/2021 | Määttä |
| 10,921,863 B2 | 2/2021 | Gault |
| 10,923,261 B2 | 2/2021 | Singla |
| 10,936,020 B2 | 3/2021 | Chang et al. |
| 10,948,999 B2 | 3/2021 | Hewett |
| 11,023,016 B2 | 6/2021 | Kim |
| 11,048,304 B2 | 6/2021 | Kang |
| 11,048,337 B2 | 6/2021 | Fukumoto |
| 11,061,442 B2 | 7/2021 | Gault |
| 11,062,831 B2 | 7/2021 | Määttä |
| 11,066,861 B2 | 7/2021 | Zhu |
| 11,073,871 B2 | 7/2021 | Jung et al. |
| 11,086,975 B2 | 8/2021 | Huang et al. |
| 11,091,855 B2 | 8/2021 | Holbery |
| 11,095,071 B2 | 8/2021 | Lee |
| 11,119,535 B2 | 9/2021 | Haworth |
| 11,211,212 B2 | 12/2021 | Huang |
| 11,307,615 B2 * | 4/2022 | Zimmerman ......... G06F 1/1698 |
| 2005/0138775 A1 | 6/2005 | Oakley |
| 2011/0147398 A1 | 6/2011 | Ahee et al. |
| 2014/0211393 A1 | 7/2014 | Lee |
| 2015/0192966 A1 | 7/2015 | Kim et al. |

FOREIGN PATENT DOCUMENTS

| | | |
|---|---|---|
| WO | 2001031457 A1 | 5/2001 |
| WO | WO 2021/194484 A1 | 9/2021 |

OTHER PUBLICATIONS

PCT Invitation to Pay Additional Fees with Partial Search Report and Provisional Opinion, PCT Application No. PCT/IB2022/000703, Apr. 3, 2023, 18 pages.

PCT International Search Report and Written Opinion, PCT Application No. PCT/IB2022/000703, Jun. 2, 2023, 23 pages.

* cited by examiner

Scribe System
100

Folded Configuration
400

Alternate Folded
Configuration
425

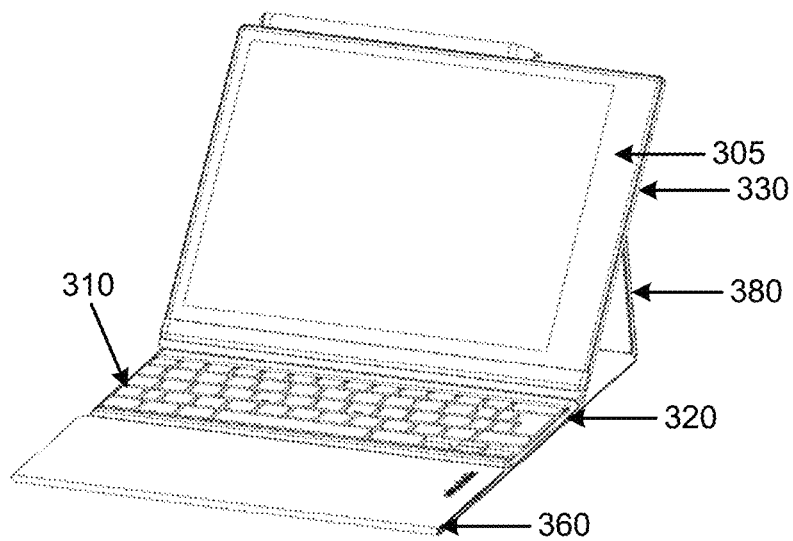
FIG. 4C  High Elevation Configuration 450
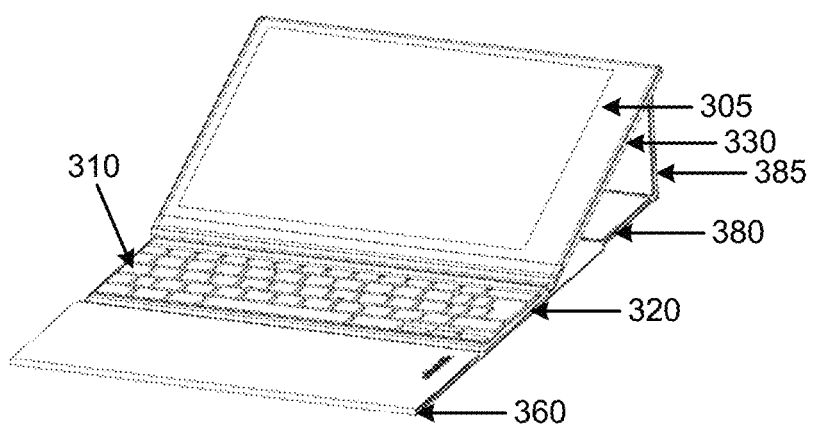
FIG. 4D  Low Elevation Configuration 475

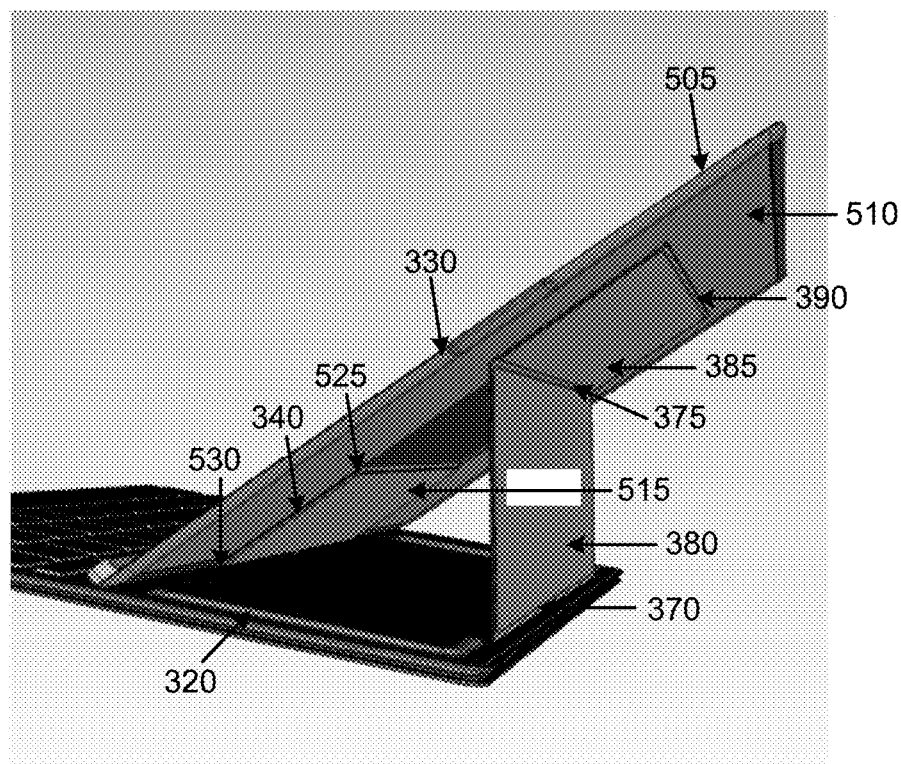
FIG. 5A  High Elevation Configuration 450
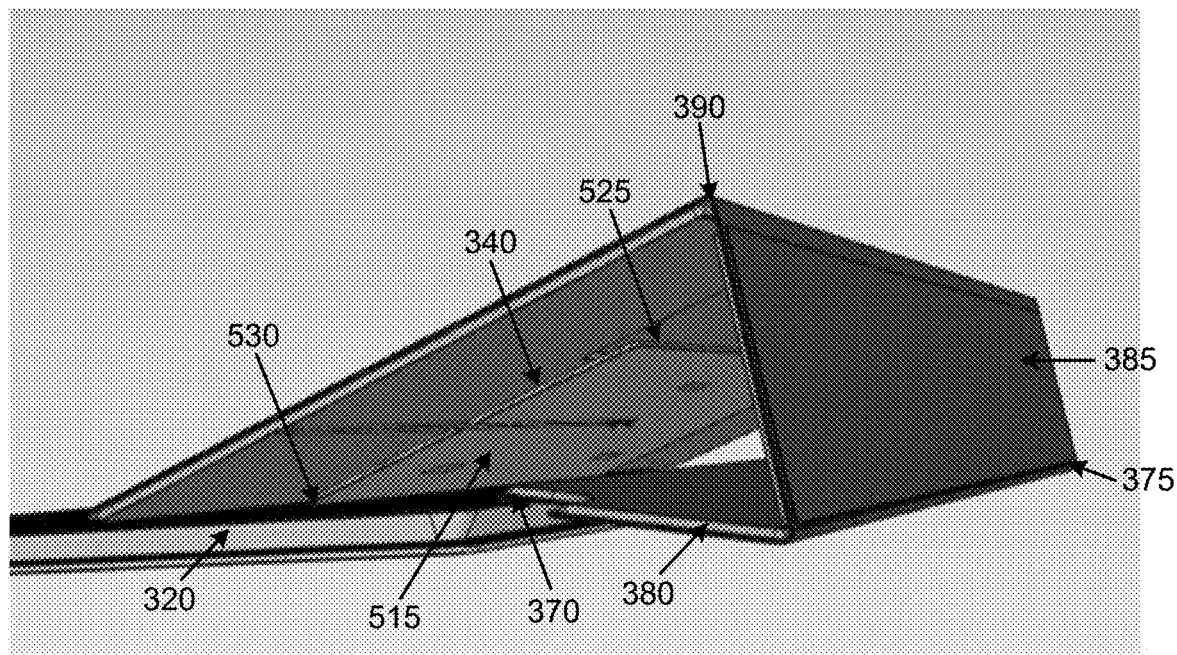
FIG. 5B  Low Elevation Configuration 475

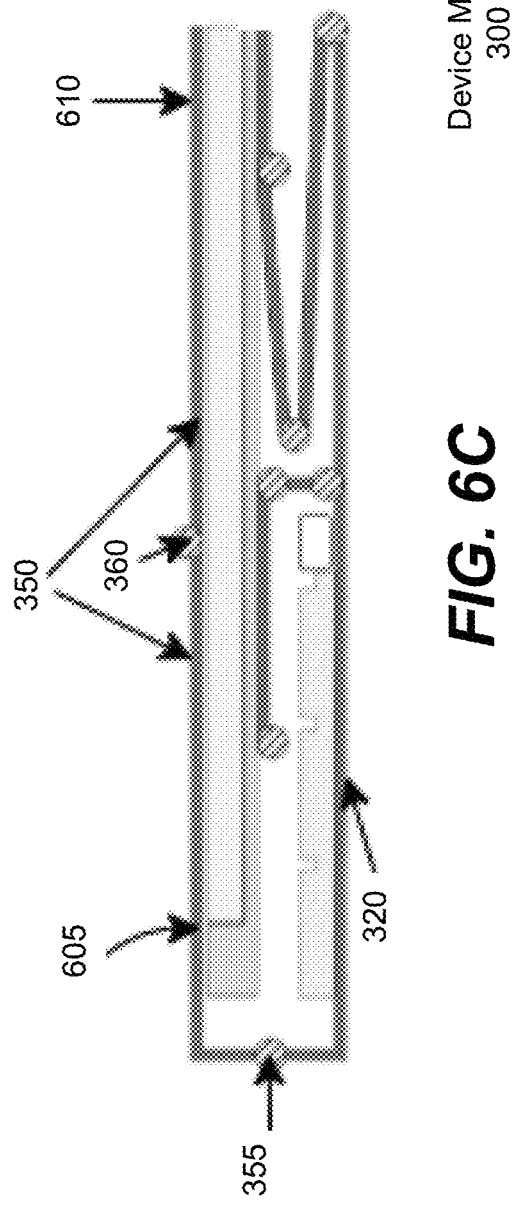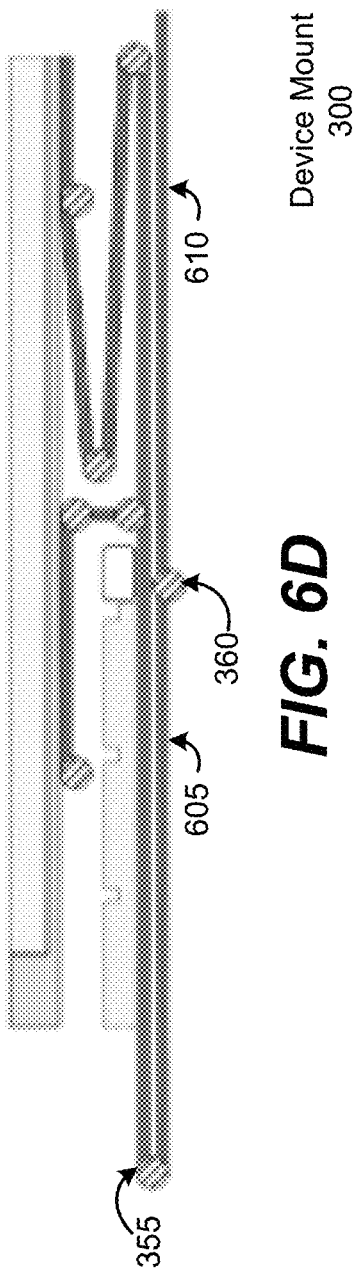

DEVICE MOUNT FOR SUPPORTING A COMPUTING DEVICE

CROSS REFERENCE TO RELATED APPLICATIONS

This application claims the benefit of U.S. Provisional Patent Application No. 63/278,548, filed on Nov. 12, 2021, which is incorporated herein in its entirety for all purposes.

TECHNICAL FIELD

This disclosure relates generally to a device mount for a tablet device, and more specifically, to a device mount that electronically couples the tablet device to the device mount and supports the tablet device at different orientations.

BACKGROUND

Computing devices, for example display devices or tablet devices, are often compatible with external device mounts that may be folded to adjust the orientation of the computing device. For example, the device mount may be adjusted to orient the computing device in a flat configuration or raise the device to various viewing configurations at different angles relative to a surface. Some of these device mounts are further designed to detachably couple an external keyboard to the computing device. Such design mounts can be further adjusted to fold the computing device to an orientation where a user can interact directly with the screen of the computing device. However, the design of these conventional device mounts often leaves the keyboard exposed when the device mount is folded, which can be cumbersome to a user trying to interact with the screen of the computing device. In some embodiments, the device mount may be folded in a manner that brings the screen of the computing device into contact with the keyboard, which may scratch or cause wear and tear on the of the computing device.

Additionally, an electrical connection may be established between an external keyboard and the device mount by at least two electrical wires routed through the device mount. This electrical connection allows a user to use the keyboard while also operating a device coupled to the device mount. However, the more complex the design of the device mount, the more difficult it is to arrange or route the electrical wires through the folding components of the device mount. For example, some components of the device mount may fold or bend at orientations that require the wires to rotate at higher angles. Conductors within the device may experience material fatigue due to repeated bends in the device mount.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIGS. 4A-D illustrate a device mount folded into different configurations, according to one example embodiment.

FIGS. 5A-B illustrates a rear angle view of a device mount in a high elevation configuration and a low elevation configuration, according to one example embodiment FIGS. 6A-D illustrate side views of the device mount in various folded configurations, according to one example embodiment.

Figure 1:
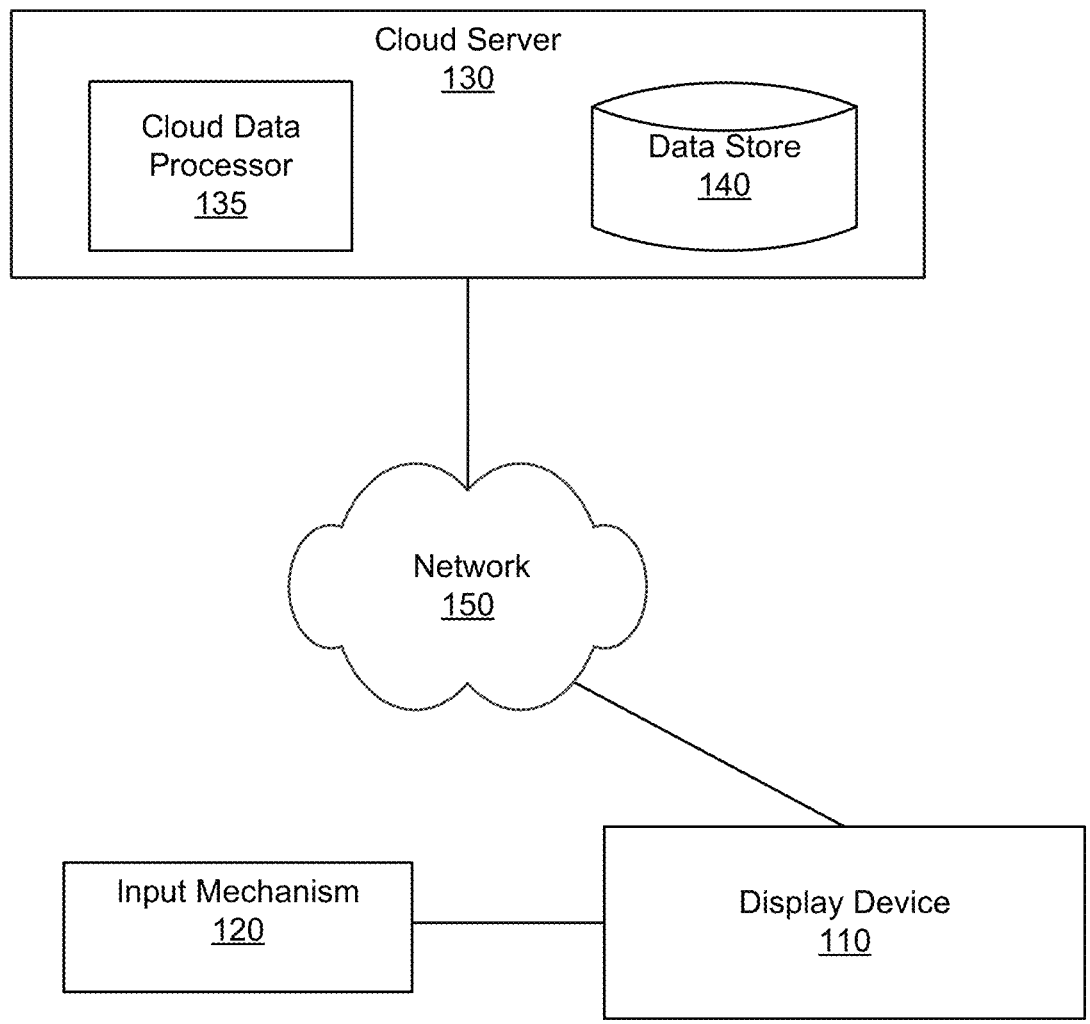
FIG. 1 illustrates a system architecture for a scribe system for transcribing content on a screen based on user input, according to one example embodiment.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Disclosed is a device mount for adjusting the orientation of a computing device removably coupled to the device mount. The device mounts rests on a surface. The device mount physically couples to a computing device (also referred to herein as a display device) to secure the computing device while adjusting the orientation of the computing device. The device mount comprises plates, panels, and hinges that enable the display mount to be folded between a folded configuration where the computing device is oriented parallel with the surface and upright configurations where the computing device is oriented at various upright angles relative to the surface.

In an embodiment, the device mount orients a display device. The device mount comprises a bottom plate, a backplate, an upper support panel, and a lower support panel. The bottom plate removably or permanently couples to an input mechanism. The backplate has a first face that removably couples to the display device and a second face opposite the first face. The upper support panel comprises a first hinge and a second hinge. The first hinge (also referred to as a "first backplate hinge") couples the upper support panel to a first portion of the backplate. The second hinge (also referred to as a "first bottom plate hinge") couples the upper support panel to a first portion of the bottom plate. The upper support panel rotates about the first hinge and the second hinge to support the backplate as it is raised relative to the bottom plate.

In some embodiments, the supper support panel comprises a first segment coupled to the backplate at a first hinge and a second segment is coupled to a bottom plate of the device mount at the second hinge. As the backplate is raised to an upright orientation, the first segment of the upper support panel rotates about the first hinge away from the backplate and the second segment rotates about the second hinge away from the bottom plate. The first segment and the second segment are coupled at a medial hinge. The first segment and the second segment rotates about the first medial hinge to bend the upper support panel to support the backplate as it is raised and folded relative to the bottom plate.

The lower support panel comprises a third hinge and a fourth hinge. The third hinge (also referred to as a "second backplate hinge") couples the lower support panel to a second portion of the second surface of the backplate. The fourth hinge (also referred to as a "second bottom plate hinge") couples the lower support panel to a second portion of the bottom plate. The lower support panel rotates about the third hinge and the fourth hinge to support the backplate as it is raised relative to the bottom plate. As the back is raised relative to the bottom plate, the third backplate rotates about the third hinge away from a first face of the lower support panel to rest against a second face of the lower support panel.

The disclosed device mount additionally comprises electronic components for electrically coupling the display device to the device mount and the input mechanism. Embodiments of the input mechanism are described with reference to a keyboard but a person having ordinary skill in the art would appreciate that the input mechanism may be any suitable device, for example a touchpad. As described above, the backplate has a first surface for removably coupling the display device and a bottom plate coupling an input mechanism. The backplate further comprises one or more conductive pins that electronically couple the display device to the backplate. The conductive pins may be spring-loaded conductors.

When the backplate couples the display device, each conductive pin contacts a complementary receptacle on a surface of the display device, which establishes an electrical connection between the display device and the device electronics in the backplate. When the conductive pin breaks contacts with the receptacles (e.g., the because the device mount was folded or raised or display device was removed), the electrical connection is broken. In one embodiment, folding the device mount to a configuration that positions the display device at an orientation parallel with the surface disconnects the conducive pins from the receptacles of the computing device, so that the user can no longer operate the keyboard. As described above, in this folded configuration, the device mount positions the display device to overlay the keyboard, covering the keyboard beneath the display device. In comparison, raising the device mount to an upright configuration exposes the input mechanism and establishes the electrical connection between the conductive pins of the backplate and the receptacles of the display device. The backplate further comprises a first conductive contact coupled to the second surface of the backplate (e.g., the face opposite the first surface). A first conductor connects the device electronics in the backplate to the first conductive plate.

The device mount further comprises the lower support panel for supporting the backplate at upright orientations. The lower support panel comprises a second conductive contact coupled to a face of the support panel. A second conductor connects the second conductive contact to a controller that encodes inputs received at the input mechanism into signals comprising instructions for the display device and transmitting the encoded signals to the display device over the electronic connection between the display device and the input mechanism. As described above, the lower support panel rotates as the backplate is transitioned between an upright and folded orientation. As the backplate is transitioned to an upright orientation, the rotation of the lower support panel moves the second conductive contact into contact with the first conductive contact to establish an electrical connection between the first conducive contact and the second conductive contact. The combination of electrical connections established by 1) the conductive pins in contact with the receptacles, 2) the conductor between the device electronics and the first conductive surface, 3) the first conductive contact and the second conductive contact, and 4) the conductor between the second conductive contact and the controller establish an electrical connection between the display device and the input mechanism. As the backplate is transitioned to a folded configuration, the rotation of the lower support panel moves the second conductive contact away from the first conductive contact to break the electrical connection.

Accordingly, the device mount described herein is a compact design which improves upon conventional device mounts that attach electronic keyboards by concealing the keyboard when not in use. Additionally, the device mount replaces conventional static electric cables routed through a device mount with one or more spring-loaded conductive pins that establish an electrical connection between the detachable keyboard and the device mount only when the computing device is oriented at an angle suitable for the keyboard to be used.

System Configuration

Turning now to FIG. 1, it illustrates a system architecture for a scribe system 100 that enables (or provides) for display on a screen (or display) rendered by input from a user (e.g., handing writing, gesture, or the like), according to one example embodiment. In the example embodiment illustrated in FIG. 1, the scribe system comprises a display device 110, an input mechanism 120, a cloud server 130 and a network 150.

The display device 110 is any computing with a screen capable of displaying content to a user. In some embodiments, the display device 110 is any computing device with a screen capable of receiving user inputs by contact with the screen (e.g., handwriting, gestures). The inputs are processed into instructions for updating content displayed on the screen. Examples of the display device 110 may include a computing device with a touch-screen (hereafter referred to as a contact-sensitive screen), for example a tablet device. It is noted that the principles described herein may be applied to other devices with a contact-sensitive screen, for example, desktop computers, laptop computers, portable computers, personal digital assistants, smartphones, or any other device including computer functionality. Examples of touchscreen technologies include resistive touch technology, optical touchscreen technology, surface acoustic wave technology, capacitive touch technology or electromagnetic guidance technology.

The display device 110 receives inputs from an input mechanism 120. The input mechanism 120 may be physically coupled to the display device 110, for example a wired connection or any other suitable electrical connection or communicatively coupled to the display device 110, for example any suitable wireless connection. In one embodiment, the input mechanism 120 applies an input to the computing device by making physical contact with a contact-sensitive surface (e.g., the touch-sensitive screen) on the display device 110 (e.g., the touch-sensitive screen) on the display device 110. Where the input to the contact-sensitive screen is a gesture performed by a user, the display device 110 generates and executes instructions for updating content displayed on the screen to reflect the gesture. For example, in response to a gesture transcribing a verbal message (e.g., a written text or drawing), the display device 110 updates the content displayed on the contact-sensitive screen to display the transcribed message. As another example, in response to a gesture selecting a navigation option, the display device 110 updates the content displayed on the contact-sensitive screen to display a new page associated with the navigation option.

The input mechanism 120 refers to any device or object that is compatible with providing inputs or instructions to the display device 110. In some embodiments, the input mechanism 120 provides inputs to the computing device by contacting the contact-sensitive screen of the computing device. An input may be contact with a single point on the contact-sensitive screen or a gesture across several points, for example a scribble. In such embodiments, the input mechanism 120 may refer to any device or object that can interface with a contact-sensitive screen and, from which, the screen can detect said contact from the input mechanism 120. Examples of a suitable input mechanism include, but are not limited to, a stylus, another type of pointing device, or a part of a user's body (e.g., a finger).

Once the display device 110 detects a touch or contact by the input mechanism 120, electronic elements of the contact-sensitive screen generate a signal that encodes instructions for displaying content on the screen or updating content previously displayed on the screen based on the touch or contact. For example, when processed by the display device 110, the encoded signal may cause the contact-sensitive screen to display a representation of the detected input on the screen. In one embodiment, the input mechanism 120 may interact with a display device 110 configured with an electronic ink (e.g., E-ink) contact-sensitive screen.

In some embodiments, the input mechanism 120 is an encased magnetic coil. When positioned in proximity to the screen of the display device 110, the magnetic coil generates a magnetic field that encodes a signal with instructions, which the display device 110 processes to display a representation of an input on the contact-sensitive screen (e.g., a marking or gesture). A person having ordinary skill in the art would appreciate that the display device 110 both generates and communicates the encoded signal. The encoded signal may have a signal pattern, which may be used for further analog or digital analysis (also referred to as "interpretation"). The input mechanism 120 may be pressure-sensitive such that the magnetic coil compresses when the input mechanism 120 contacts the contact-sensitive screen. The interaction between the compressed magnetic coil and the contact-sensitive screen may generate a different encoded signal depending on the properties of the input. For example, instructions encoded on different signals may cause the computing device to display representations of varying thickness (e.g., thicker line markings). In alternate embodiments, the input mechanism 120 comprises a power source, for example a battery, that generates a magnetic field with a contact-sensitive surface.

In some embodiments, the contact-sensitive screen is a capacitive touchscreen designed using a glass material coated with a conductive material. Electrodes, or an alternative current-carrying electrical component, are arranged vertically along the glass coating of the screen to maintain a constant level of current running throughout the screen. A second set of electrodes are arranged horizontally. The matrix of vertical active electrodes and horizontal inactive electrodes generates an electrostatic field at each point on the screen. When an input mechanism 120 with conductive properties, for example the encased magnetic coil or a human finger, is brought into contact with a point(s) on the screen of the display device 110, current flows through the horizontally arranged electrodes, disrupting the electrostatic field at the contacted point. The display device 110 measures the disruption in the electrostatic field at each point contacted by the input or gesture (e.g., a change in capacitance) and encodes the disruption into an analog or digital signal.

In other embodiments, the contact-sensitive screen is a resistive touchscreen. The resistive touch screen comprises two metallic layers: a first metallic layer in which striped electrodes are positioned on a substrate, for example a glass or plastic, and a second metallic layer in which transparent electrodes are positioned. When an input mechanism 120 such as a finger, stylus, or palm makes contact with the surface of the contact-sensitive screen, the two layers of the touchscreen are pressed together. Upon contact, the display device 110 applies a voltage gradient to the first layer and measured as a distance by the second layer to determine a horizontal coordinate of the input on the screen. Subsequently, the display device 110 applies a voltage gradient to the second layer to determine a vertical coordinate of the input on the screen. The display device 110 registers an exact location of the input on the contact-sensitive screen based on the combination of the horizontal coordinate and the vertical coordinate. Unlike a capacitive touchscreen which relies on a conductive input mechanism 120, a resistive touchscreen detects contact by nearly any input mechanism 120.

In other embodiments, the contact-sensitive screen is an inductive touchscreen. An inductive touchscreen comprises a metal front layer that detects deflections when an input mechanism contacts the screen. Accordingly, an inductive touchscreen detects contact from nearly any input mechanism. Although some embodiments of the display device 110 are described herein with reference to a capacitive touchscreen, a person having ordinary skill in the art would recognize that alternative touchscreen technology may be implemented. For example, a resistive touchscreen or an inductive touchscreen could also be implemented.

In some embodiments, the input mechanism 120 provides inputs to the computing device by communicating electrical signals from the input mechanism to the computing device with instructions for the computing device to update the content displayed on the contact-sensitive screen or perform another function of the computing device.

In some embodiments, the input mechanism 120 provides inputs to the computing device by contacting the contact-sensitive screen of the computing device. In such embodiments, the input mechanism 120 may be any device that couples to the computing display device 110 to establish an electrical connection between the computing display device 110 and the input mechanism. The input mechanism 120 may be a keyboard, trackpad, or any other suitable device that generates an electrical signal based on user input to the input mechanism 120 and communications the electrical signal to an electrically coupled computing display device 110. In an example embodiment where the input mechanism is a keyboard, a user inputs to the input mechanism 120 are keystrokes, which are encoded into an electrical signal with instructions for the computing display device 110 to update the contact-sensitive surface to display words or commands specified by the keystrokes. As described herein, a keyboard is any device with mechanical keys arranged in an array shape suitable for a user to type on. When each key is pressed, the key establishes or terminates an electrical connection that encodes a signal identifying that the key was pressed. Embodiments where the input mechanism 120 is a keyboard are further described below with reference to FIGS. 3-9.

The cloud server 130 receives information from the display device 110 and/or communicates instructions to the display device 110. As illustrated in FIG. 1, the cloud server 130 may comprise a cloud data processor 135 and a data store 140. Data recorded and stored by the display device 110 may be communicated to the cloud server 130 for storage in the data store 140. For example, the data store 140 may store documents, images, or other types of content generated or recorded by a user through the display device 110. In some embodiments, the cloud data processor 135 monitors the activity and usage of the display device 110 and communicates processing instructions to the display device 110. For example, the cloud data processor 135 may regulate synchronization protocols for data stored in the data store 140 with the display device 110.

Interactions between the display device 110 and the cloud server 130 are typically performed via the network 150, which enables communication between the display device 110 and the cloud server 130. In one embodiment, the network 150 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 150 may also utilize dedicated, custom, or private communication links. The network 150 may comprise any combination of local area and/or wide area networks, using both wired and wireless communication systems.

Figure 2:
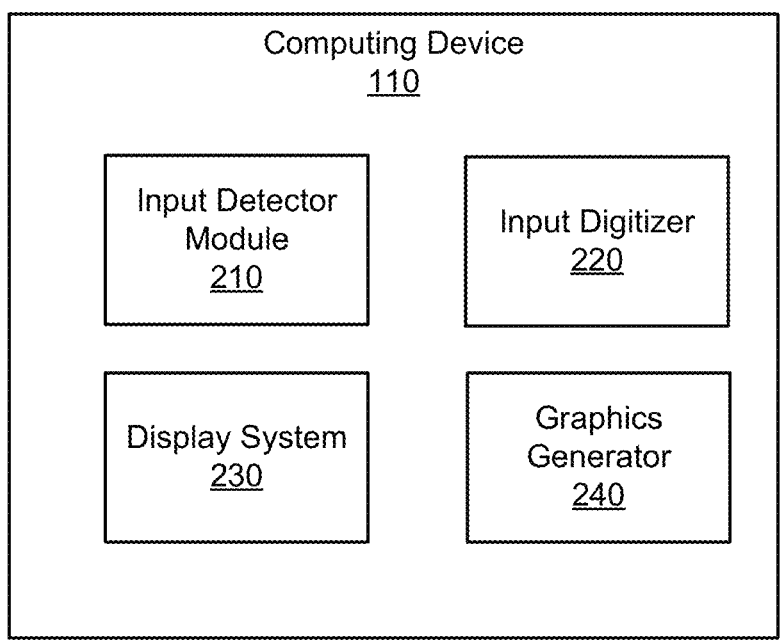
FIG. 2 is a block diagram of an example system architecture of a display device of the scribe system, according to one example embodiment.

Turning now to FIG. 2, illustrated is a block diagram of an example system architecture of a display device 110, according to one example embodiment. In the embodiment illustrated in FIG. 2, the display device 110 comprises an input detector module 210, an input digitizer 220, a display system 230, and a graphics generator 240.

The input detector module 210 may detect an input to from the input mechanism 120 at the screen of the display device 110. In one embodiment, the input detector module 210 detects an input when the input mechanism 120 makes contact with the contact-sensitive screen of the display device 110. For example, the input detector module 210 may recognize an input as part of an encoded signal generated by the compression of a coil in the input mechanism 120 and/or corresponding electronics of the display device 110. In such embodiments, the encoded signal is an analog representation of the gesture received by a matrix of sensors embedded in the display of the device 110. In another embodiment, the input detector module 210 detects an input when the input mechanism 120 transmits an electrical signal in response to an input at the input mechanism. For example, the input detector module 210 may recognize an input as part of an encoded signal generated by the pressing of a key of a keyboard. The input detector module 210 comprises electronics integrated into the contact-sensitive screen of the display device 110 (or more generally, the display device 110 itself) that interpret a signal encoded in response to a contact between the input mechanism 120 and the screen (e.g., a stylus) or an input to the input mechanism 120 itself (e.g., a keyboard).

The input digitizer 220 converts an analog signal encoded from an input detected by the input detector 210 into a digital set of instructions. The display device 110 may process the digital set of instructions to generate a user interface or content displayed on the screen based on the input. In one example embodiment, the input digitizer 220 translates physical points on the screen where the input mechanism 120 made contact into a set of instructions for the display device 110 (and more specifically the display system 230 described below) to update or display content on the contact-sensitive screen. For example, if the input detector module 210 detects a gesture that swipes from a first page to a second page, the input digitizer 220 receives the analog signal generated by the input mechanism 120 as it performs the swiping gesture. The input digitizer 220 generates a digital signal for the swiping gesture that provides instructions for the display device 110 to update content displayed on the screen to transition from, for example, a current (or first page) to a next (or second page that may be before or after the first page).

The display system 230 may include the physical and firmware (or software) components to provide content for display (e.g., render) on a screen. The displayed content may correspond to any type of visual representation that may be presented to or viewed by a user of the display device 110. The display system 230 presents generated or updated graphics through the contact-sensitive screen of the display device 110.

Based on the digital signal generated by the input digitizer 230, the graphics generator 240 generates graphics (e.g., content) or updates graphics of a user interface to be displayed on the screen of the display device 110. The display system 240 presents the generated graphics for display to a user using electronics integrated into the contact-sensitive screen.

In one example embodiment, the graphics generator 240 receives the digital instructional signal (e.g., swipe gesture indicating page transition (e.g., flipping or turning) generated by the input digitizer 220. The graphics generator 240 generates graphics or an update to the previously displayed user interface graphics based on the received signal. The generated or updated graphics of the user interface are provided for display on the screen of the display device 110 by the display system 230, e.g., displaying a transition from a current page to a next page to a user.

Adjustable Device Mount for Orienting a Display Device

Figure 3:
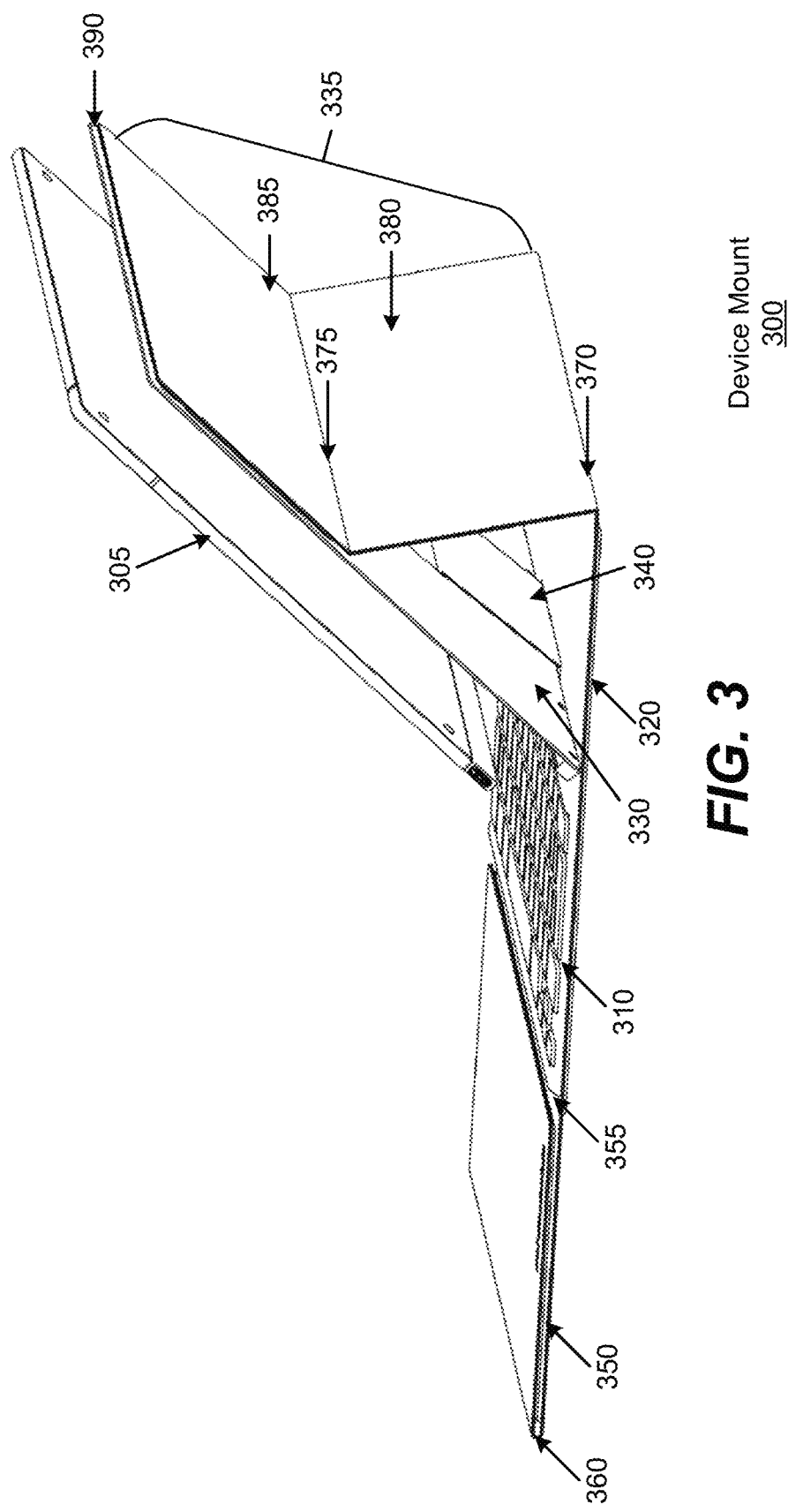
FIG. 3 is a rear angle view of a device mount coupled to a keyboard attachment and a computing device, according to one example embodiment.

FIG. 3 illustrates a rear angle view of a device mount 300 physically coupled to an example display device 305, according to one example embodiment. As described above, the display device 305 is a computing device that displays content to a user, for example, a tablet device similar to the display device 110. The display device 305 may include a contact-sensitive screen through which a user may provide inputs to the device 305 or interact with content displayed on the screen. In FIG. 3, the input mechanism is a keyboard 310, but any other suitable input mechanism may be used with the device mount 300 as described herein.

The illustrated device mount 300 comprises a bottom plate 320, a backplate 330, an upper support panel 335, a lower support panel 340, and a screen cover 350. The bottom plate 320 is the base of the device mount 300. When positioned on a surface (e.g., a work surface or shelf), the posterior face of the bottom plate 320 (e.g., side of the bottom plate facing the surface) rests against the surface. The anterior face of the bottom plate 320 (e.g., side of the bottom plate facing away from the surface) may removably couple to the keyboard 310 by a securing mechanism, for example a pressure-sensitive clasp or one or more magnets. In other embodiments, the anterior face of the bottom plate 320 is permanently attached to the keyboard 310.

When the device mount 300 is folded to a folded configuration or when the device 305 is not being used, the screen cover 350 protects the contact-sensitive surface of the display device 305 or the entire display device 305. In some embodiments, the bottom plate 320 couples to a screen cover 350 at a cover hinge 355 on along a first edge of the bottom plate 320. The cover hinge 355 and other hinges described herein are semi-rigid joints that enable the device mount 300 to fold and bend to support various orientations of the backplate 330. The screen cover 350 rotates about the cover hinge 355 to cover or expose the contact-sensitive screen of the display device 305. The screen cover 350 may be folded along creases in the screen cover 350 to accommodate different configurations. For example, the screen cover 350 may bend at certain edges to fold underneath the display device 305, hiding the cover 350 beneath the display device 305. As another example, the screen cover 350 may bend at certain edges to fold the screen cover 350, supporting the palms of a user using the keyboard 310.

In some embodiments, the screen cover 350 is divided into multiple segments (not shown), each separated by a folding hinge 360. Each segment of the screen cover 350 may be large enough to cover the entire contact-sensitive screen of the display device 305 and rigid enough to protect the screen from damage. A first segment of the screen cover 350 couples to the bottom plate 320 at the cover hinge 355. The first segment rotates about the cover hinge 355 to cover the entire screen cover 350. A second segment of the screen cover 350 couples to the first segment at a folding hinge 360. The second segment rotates about the folding hinge 360 to either extend the length of the front cover by unfolding the second segment to lay against the surface or reduce the length of the front cover by folding second segment on top of or underneath the first segment. In some embodiments, the length of the folding hinge 360 is equivalent to or nearly equivalent to the length of the two segments. The screen cover 350 is further discussed below with reference to FIGS. 6A-D.

The second end of the bottom plate 320 (opposite the end coupled to the screen cover 350) couples to a first end of the upper support panel 335 at a bottom plate hinge 370. Additionally, the second end of the support panel 335 (opposite the end coupled to the bottom plate 320) couples to the backplate 330 at a backplate hinge 390. When the device mount 300 is folded and unfolded between configurations, the backplate 330 rotates about the backplate hinge 390 and the second end of the upper support panel rotates about the bottom plate hinge 370, to adjust the orientation of the backplate 330 relative to the bottom plate 320. Accordingly, when the display device 305 is coupled to the backplate 330, rotation of the backplate 330 also rotates the display device 305 to different orientations relative to the bottom plate 320. When the backplate 330 is folded to an orientation parallel with the bottom plate 320, the upper support panel 335 folds at to lie between the bottom plate 320 and the backplate 330. When the device mount 300 is adjusted to raise the backplate 330 to an upright orientation, the upper support panel 335 unfolds to support the backplate 330 in its upright orientation. As described herein, the back plate is positioned in an "upright orientation" when it is oriented at any non-parallel angle relative to the bottom plate 320.

The upper support panel 335 is a right or semi-rigid structure that supports the combined weight of the backplate 330 and any coupled display device 305. In some embodiments (illustrated in FIG. 3), the upper support panel 335 is divided into two segments: a lower segment 380 and an upper segment 385. The lower segment 380 is coupled to the upper segment 385 at the medial hinge 375. The upper segment 385 may be coupled to the backplate 330 at a backplate hinge 390. When the device mount 300 is folded into different configurations, the lower segment 380 and/or the upper segment 385 rotate about the medial hinge 375 to fold and unfold the upper support panel 335. Accordingly, when the backplate 330 is raised to different upright orientations, the lower segment 380 and/or the upper segment 385 supports the backplate 330 at each orientation. In the embodiment illustrated in FIG. 3, the backplate 330 is raised to an upright orientation supported by the lower segment 380. The upper support panel 335 is further described below with reference to FIGS. 6A-D and 7A-C.

In alternate embodiments (not shown), the upper support panel 335 may be a single structure without the medial hinge 375. For example, the upper support panel 335 may only include the lower segment 380. In such embodiments, the medial hinge 375 that couples the lower segment 380 and the upper segment 385 is replaced by a backplate hinge 390 that couples the lower segment 380 to the backplate 330. Accordingly, the backplate 330 rotates about the backplate hinge 390 as the lower segment 380 is raised and lowered. In such embodiments, the upper support panel 335 rests at an angle relative to the bottom plate to support the backplate 330 in folded configurations.

The lower support panel 340 is a rigid or semi-rigid structure that supports the backplate 330 when raised to an upright orientation. In some embodiments, the lower support panel 340 is divided into sections separated by hinges (not shown) which allow each section of the lower support panel 340 to rotate to support the backplate 330 at various orientations relative to the bottom plate and/or when oriented parallel to the bottom plate. The lower support panel 340 is further described below with reference to FIGS. 6A-D and 7A-C.

Figure 4A:
Figure 4B:

The device mount 300 folds into various configurations, each of which enables the display device 305 to be used in a different manner. FIGS. 4A-D illustrate a device mount folded into different configurations, according to one example embodiment. FIG. 4A illustrates a device mount (e.g., the device mount 300) in a folded configuration 400, according to one example embodiment. In the folded configuration, the device mount is folded to orient a backplate (e.g., the backplate 330) parallel with the bottom plate (e.g., the bottom plate 320). In the configuration illustrated in FIG. 4A, the screen cover 350 is rotated about a cover hinge 355 to shield the screen of the display device 305. As an example, the device mount may be folded in the configuration 400 illustrated in FIG. 4A when the display device 305 is not being used. FIG. 4B illustrates a device mount (e.g., the device mount 300) in an alternate folded configuration 425, according to one example embodiment. The device mount in FIG. 4B is folded in the same folded configuration as FIG. 4A, but in FIG. 4B, the screen cover 350 is rotated about the cover hinge 355 to fold underneath the display device 305. In this configuration, the screen cover 350 is hidden beneath the display device 305. In the configuration illustrated in FIG. 4B, the screen cover 350 may be rotated and/or folded such that the bottom plate (e.g., the bottom plate 320) rests on the screen cover 350. As an example, the device mount may be folded in the configuration 425 illustrated in FIG. 4B so that a user may operate the device by interacting directly with the contact-sensitive screen of the display device 305 (e.g., using a stylus to write or draw directly on a contact-sensitive screen).

FIG. 4C illustrates a configuration where the device mount (e.g., the device mount 300) is raised to an upright orientation, according to one example embodiment. As described herein, the illustrated upright orientation is referred to as a "high elevation configuration" 450. In the high elevation configuration 450, a keyboard 310 is coupled to the anterior face of the bottom plate 320. The configuration illustrated in FIG. 4C exposes the keyboard 310 for a user to type while operating the display device 305. The backplate 330 is raised to an upright orientation (e.g., an angle relative to the bottom plate 320). At the illustrated upright orientation, the lower segment 380 of the upper support panel 335 supports the backplate 330. Additionally, the backplate 330 is oriented at an angle where electronics within the backplate 330 contact electronics of the keyboard 310, establishing an electrical connection between the display device 305 coupled to the backplate 330 and the keyboard 310. Once established, the electrical connection enables the display device 305 to receive digital signals encoded from inputs to the keyboard 310. The electrical connection and the components of the device mount that establish the electrical connection are further described below with reference to FIGS. 8A-F and 9. Additionally, one segment of the screen cover 350 may be folded about a folding hinge 360 to lay on top of an adjacent segment of the screen cover 350, forming a support (or rest) for the user's hands. As an example, the device mount may be raised to the configuration 450 illustrated in FIG. 4C so that a user may operate the device 305 using only the keyboard 310. In some embodiments, the screen cover 350 comprises a single segment without a folding hinge 350.

FIG. 4D illustrates a configuration where the device mount (e.g., the device mount 300) is raised to an alternate upright orientation, according to an example embodiment. As described herein, the illustrated alternate upright orientation is referred to as a "low elevation configuration" 475. The high elevation configuration and low elevation configuration are described relative to each other. The low elevation may be closer in distance to a surface, e.g., a table or desk, while the high elevation may be further in distance from the surface. High elevation configurations and low elevation configurations are further described below with reference to FIGS. 7A-C. The configuration illustrated in FIG. 4D exposes the keyboard 310 and folds the screen cover 350 similarly to the configuration illustrated in FIG. 4C. The configuration in FIG. 4D additionally electronically couples the keyboard 310 to the display device 305 as described in FIG. 4C by folding the backplate 330 such that electronics of the backplate 330 contact electronics of the keyboard 310. In the configuration illustrated in FIG. 4C, the backplate 330 is oriented at a steeper angle relative to the bottom plate 320 compared to the configuration illustrated in FIG. 4D. In the illustrated upright orientation, the upper segment 385 supports the backplate 330 while the lower segment 380 lays parallel with the bottom plate 320. As an example, the device mount 300 may be raised to the configuration 475 illustrated in FIG. 4D so that a user may operate the device 305 using both the keyboard 310 and an input mechanism directly on the contact-sensitive screen of the display device 305.

FIG. 5A illustrates a rear angle view of a device mount 300 in a high elevation configuration 450, according to one example embodiment. As described above with reference to FIG. 4C, the lower segment 380 of the upper support panel 335 supports the backplate 330 in the high elevation configuration 450. As described above with reference to FIG. 3, the lower segment 380 is coupled to the bottom plate 320 at a bottom plate hinge 370, which allows the upper support panel to rotate as the backplate 330 is raised or folded. As illustrated in FIG. 5A, the backplate 330 has two surfaces—a first surface 505 on which the device is mounted and a second surface 510 opposite the first surface 505. In the illustrate embodiment, the upper support panel 335 additionally includes an upper segment 385 connected to the lower segment 380 at the medial hinge 375. In the high elevation configuration 450, the upper segment 385 rotates about the medial hinge 375 and the backplate hinge 390 to lie flat against the second surface 510 of the backplate.

Additionally, the lower support panel 340 has two faces—a first face 515 and a second face against which the backplate rests in the high elevation configuration. In the illustrated embodiment of FIG. 5A, the second face of the lower support panel 340 is obscured because the backplate 330 is resting against it. As the backplate is raised to a steeper orientation or folded, the lower support panel 340 rotates about a second backplate hinge 525 and a second bottom plate hinge 530. The rotation of the lower support panel 340 about the hinges 525 and 530 adjusts the orientation of the lower support panel 340 relative to the bottom plate 320. As the backplate 330 is lowered into a folded orientation (e.g., the folded configuration 400 and/or 425), the backplate rotates about the second backplate hinge 525 and the lower support panel rotates about the second bottom plate hinge 530 until the backplate 330 rests against the first face 515 of the lower support panel. The rotation of the lower support panel 340, the upper support panel 335, and the backplate 330 as the device mount 300 is raised to a high elevation configuration is further described below with reference to FIGS. 7A-C.

FIG. 5B illustrates a rear angle view of a device mount 300 in a low elevation configuration 475, according to one example embodiment. As described above with reference to FIG. 4D, the upper segment 385 of the upper support panel 335 supports the backplate 330 in the low elevation configuration 475. As described above with reference to FIG. 3, the upper segment 385 is coupled to the backplate 330 at the backplate hinge 390 and the lower segment 380 at the medial hinge 375, which allows the upper segment 385 to rotate as the backplate 330 is raised or folded. As backplate 330 transitions from the high elevation configuration 450 to the low elevation configuration 450, the upper support panel 335 bends outward at the medial hinge 375. The lower support panel 380 rotates about the bottom plate hinge 370 until the lower support panel 380 lies flat against the surface on which the bottom plate 320 rests. As the lower segment 380 rotates about the bottom plate hinge 370, the upper segment 380 rotates about the medial hinge 375 and backplate 330 rotates about the backplate hinge 390 until the upper segment 385 supports the backplate 330 as illustrated in FIG. 5B. Additionally, as the backplate 330 is lowered to the low elevation configuration, the lower support panel 340 rotates about the second bottom plate hinge 530 until the backplate 330 rests against the upper support panel 385. The rotation of the lower support panel 340, the upper support panel 335, and the backplate 330 as the device mount 300 is lowered from the high elevation configuration to a low elevation configuration is further described below with reference to FIGS. 7A-C.

Figure 6A:
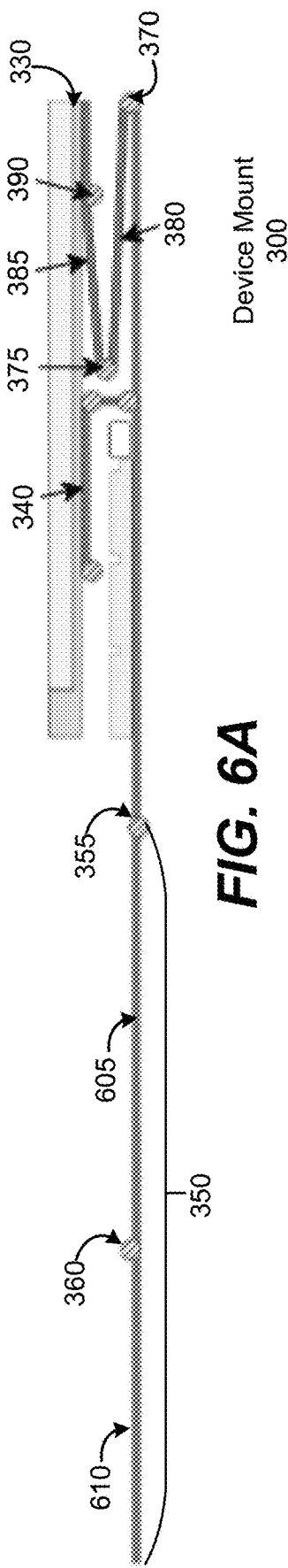

FIGS. 6A-D illustrate side views of the device mount 300 in various folded configurations, according to one example embodiment. FIG. 6A illustrates a side view of a device mount 300 in a folded configuration where the screen cover 350 is entirely unfolded, according to one example embodiment. In the folded configuration, for example the configuration illustrated in FIGS. 4B and 6A-D, the backplate 330 is parallel with the bottom plate 320. To adjust the backplate 330 into the folded configuration, the upper support panel 335, the lower support panel 340, and the backplate cooperatively rotate to bring the backplate 330 to an orientation parallel with the bottom plate 320. The simultaneous rotation of both the upper support panel 335 and the lower support panel 340 additionally translates the backplate 330 laterally (e.g., in a direction towards the user), so that the backplate 330 entirely covers the keyboard 310. When the backplate 330 is raised from the folded configuration to an upright configuration, the upper support panel 335 and the lower support panel 340 cooperatively rotate the backplate 330 to an upright orientation and translate the backplate 330 laterally (e.g., in a direction away from the user) to expose the keyboard 310, for example the configurations illustrated FIGS. 4C and 4D. Both the upper support panel 335 and the lower support panel 340 include a system of hinges (described below) that translate and rotate the backplate 330 between configurations of the display device 305. The rotation and translation of the backplate 330 between configurations of the display device 305 is further described below with reference to FIGS. 7A-C.

In the embodiment illustrated in FIG. 6A, the upper support panel 335 is divided into two segments: a lower segment 380 and an upper segment 385. The lower segment 380 is coupled to the upper segment 385 at a first medial hinge 375. The lower segment 380 and the upper segment 385 each rotate about the first medial hinge 375 to support the backplate 330 as it is folded between a folded configuration and various upright orientations. When the backplate 330 is folded down into the folded configuration, the upper and lower segments 380 and 385 rotate about the first medial hinge 375 to bend the upper support panel 335 inwards (e.g., towards the second surface 510 of the backplate), lowering the backplate 330. When the backplate 330 is raised to an upright orientation, the upper and lower segments 380 and 385 rotate about the first medial hinge 375 to bend the upper support panel 335 outwards (e.g., away from second surface 510 of the backplate), stabilizing the backplate 330 in various upright orientations. As described herein, a structure of the device mount 300 "stabilizes" the backplate 330 at an upright orientation by supporting the backplate 330, locking the backplate 330 into an orientation, or any other suitable means for preventing the backplate 330 from rotating out of the upright orientation.

The upper segment 385 couples to the backplate 330 at a first backplate hinge 390. One end of the upper segment 385 is coupled to the backplate 330 at the first backplate hinge 390 and the opposite end of the upper segment 385 is coupled to the lower segment 380 at the first medial hinge 375. The backplate 330 rotates about the first backplate hinge 390 as the backplate 330 is adjusted between upright orientations and the folded configuration.

The lower segment 380 couples to the bottom plate 320 at a first bottom plate hinge 370. One end of the lower segment 380 is coupled to the bottom plate 320 at the first bottom plate hinge 370 and the opposite end of the lower segment 380 is coupled to the upper segment 385 at the first medial hinge 375. The lower segment 380 rotates about the first bottom plate hinge 370 as the backplate 330 is adjusted between upright orientations and the folded configuration. The structure of the lower support panel 340 is further discussed below with reference to FIG. 7B.

Recalling the description above of the screen cover 350, the screen cover 350 couples to the bottom plate 320 at a cover hinge 355. The screen cover 350 may rotate about the cover hinge 355 to fold over the display device 305, shielding the screen. Alternatively, the screen cover 350 may rotate about the cover hinge 355 to fold under the display device 305, supporting or cushioning the bottom plate 320. Additionally, the screen cover 350 may be divided into rigid or semi-rigid segments, for example segments 605 and 610. Adjacent segments, for example segments 605 and 610, couple at a folding hinge 360. The segment 610 rotates about the folding hinge 360 to fold over or under the segment 605 or extend the length of the screen cover 350.

Figure 6B:
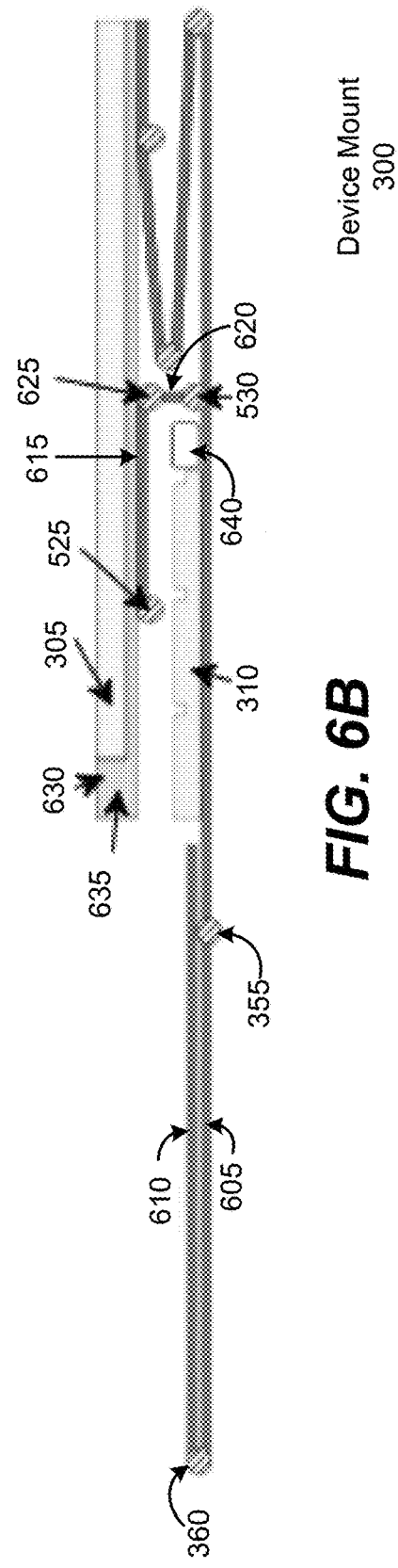

FIG. 6B illustrates a side view of the device mount 300 in a folded configuration where one segment 610 of the screen cover 350 is folded over an adjacent segment 605 of the screen cover 350, according to one example embodiment. The segment 610 rotates about the folding hinge 355 to rest on top of the segment 605. For example, a user may fold the segment 610 over the segment 605 to create a cushion for the hands of a user typing on the keyboard.

In the embodiment illustrated in FIG. 6B, the lower support panel 340 is divided into segments: a lower segment 620 and an upper segment 615 coupled at a medial hinge 625. In other embodiments, for example the embodiments illustrated in FIGS. 5A-B, the lower support panel 340 may be a single structure without a medial hinge 625. Accordingly, the medial hinge 625 may be optionally included to enable the device mount 300 to rotate the backplate to additional elevated configurations beyond the high elevation configuration and the low elevation configuration described above. In the embodiment illustrated in FIG. 6B, the lower segment 620 and the upper segment 615 each rotate about the medial hinge 625 to support the backplate 330 as it is folded between a flat configuration and various upright orientations. When the backplate 330 is folded into the folded configuration, the upper segment 615 rotates about the medial hinge 625 such that the upper segment 615 lies flat against the backplate 330 and parallel with the bottom plate 320. When the backplate 330 is raised into an upright configuration, the upper segment 615 rotates about the medial hinge 625 such that the upper segment 360 rotates at different orientations to support stabilization the backplate 330 at the upright orientation.

The upper segment 615 couples to the backplate 330 at a second backplate hinge 525. One end of the upper segment 615 is coupled to the backplate 330 at the second backplate hinge 525 and the opposite end of the upper segment 615 is coupled to the lower segment 620 at the medial hinge 625. The backplate 330 rotates about the second backplate hinge 525 as the backplate 330 is adjusted between upright orientations and the folded configuration. As described in FIG. 5A, the lower support panel 340 has a first face 515 against which the backplate rests in the folded configuration and a second face against which the backplate rests in an elevated configuration. Similarly, the upper segment 615 comprises a first face against which the backplate rests in the folded configuration and a second face against which the backplate rests in an elevated configuration. In the folded configuration illustrated in FIG. 5B, the backplate 330 rests against the first face of the upper segment 615, while the second face of the upper segment 615 faces the keyboard 310 and the backplate 320.

The lower segment 560 couples to the bottom plate 320 at a second bottom plate hinge 530, which may also be referred to as a lower hinge. One end of the lower segment 620 is coupled to the bottom plate 320 at the second bottom plate hinge 530 and the opposite end of the lower segment 620 is coupled to the upper segment 615 at the medial hinge 625. The lower segment 620 rotates about the second bottom plate hinge 530 as the backplate 330 is adjusted between upright orientations and the folded configuration.

Each segment of the upper support panel 335 and the lower support panel 340 are rigid enough to support the backplate 330 and a display device 305 coupled to the backplate 330. In the folded configuration, the backplate 330 covers the entire keyboard 310, but the upper support panel 335 and the lower support panel 340 support the backplate 330 at an elevated position to prevent the backplate 330 from contacting the keyboard 310 (e.g., pressing the keys on the keyboard 310). In the embodiment illustrated in FIG. 5B where the lower support panel comprises two segments and a medial hinge 625, the lower segment 620 rests perpendicular to both the backplate 330 and the bottom plate 320 when the device mount is folded and the upper segment 615 rests parallel to the bottom plate 320. Accordingly, the perpendicular orientation of the lower segment 620, the parallel orientation of the upper segment 615 of the lower support panel 340, and the folded configuration of the upper support panel 335 support the backplate 330 in its folded configuration.

In alternate embodiments where the lower support panel is a single structure without a medial hinge 625, for example the device mount illustrated in FIGS. 3 and 5A-B, the lower support panel 340 rests at an angle relative to the bottom plate 320 when the device mount 300 is folded. In such embodiments, the device the angled orientation of the lower support panel 340 and the folded orientation of the upper support panel 335 support the backplate 330 in its folded configuration. In some embodiments (not shown), at least two edges of the bottom plate 320 are lined with support structures upon which the backplate 330 rests, preventing the backplate 330 from contacting the keyboard 310. In such embodiments, each support structure is taller than (e.g., a height that is greater than) the keys of the keyboard 310. In some embodiments, the entire perimeter of the bottom plate 320 is lined with the support structures.

The bottom edge of the backplate 330 (e.g., the edge in contact with the keyboard 310 when in an upright orientation) is encased in a spine 630 of the backplate 330. The spine supports the bottom edge of the display device 305 and prevents the display device 305 from sliding on the backplate 330. In some embodiments, the spine 630 comprises magnets or another suitable means for securing the display device on the backplate 330. The spine 630 houses electronics that enables the continued performance and functionality of a display device 305 coupled to the backplate 330. For example, the spine 630 may contain components that enable certain functionalities of the display device 305 including, but not limited to, sensors for determining whether the device is in use, sensors for measuring the proximity of an input mechanism or a user, sensors for measuring environmental parameters (e.g., temperature and moisture), power sources, and components that enable near-field communication between the device mount 300, the display device 305, and/or the keyboard 310. Additionally, the spine 630 houses electronics 635 that establish an electrical connection between the display device 305 and the keyboard 310. The spine 630 may contain electronics 635 that communication with a controller 640 positioned in proximity to the keyboard 310. The controller 640 may comprise a printed circuit board with a microcontroller that establishes electrical connections between the keyboard 310 and the electronics 635 in the spine 630. The controller 640 and/or the keyboard 310 may additionally include additional sensors and/or batteries.

In one embodiment, the spine 630 comprises spring-loaded electric terminals that establish an electrical connection with the keyboard 310 upon contact with complementary electric receptacles in the keyboard 310. Such spring-loaded electric terminals are further described below with reference to FIGS. 8A-E and 9.

FIG. 6C illustrates a side view of the device mount 300 in a folded configuration where the screen cover 350 is folded over the display device, according to one example embodiment. The screen cover 350 rotates about the cover hinge 355 such that both segments 605 and 610 cover the display device 305. For example, a user may fold the screen cover 350 over the display device 305 protect or shield the display device 305 from contact or damage.

FIG. 6D illustrates a side view of the device mount 300 in a folded configuration where the screen cover 350 is folded under the display device, according to one example embodiment. The screen cover 350 rotates about the cover hinge 355 such that both segments 605 and 610 are folded beneath the backplate 320. For example, a user may fold the screen cover 350 under the display device 305 to support the device mount 300 or hide the cover 350 while a user interacts with the contact-sensitive screen of the display device 305.

Figure 7A:
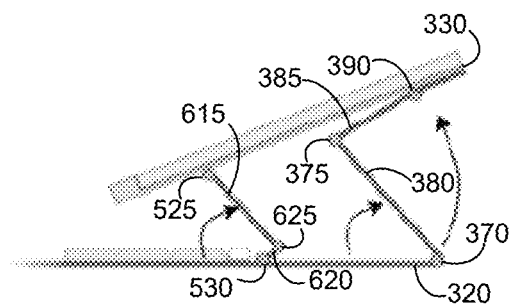
FIGS. 7A-C illustrate the transition of the device mount from a folded configuration to raise the backplate to various upright orientations, according to one or more embodiments.
Figure 7B:
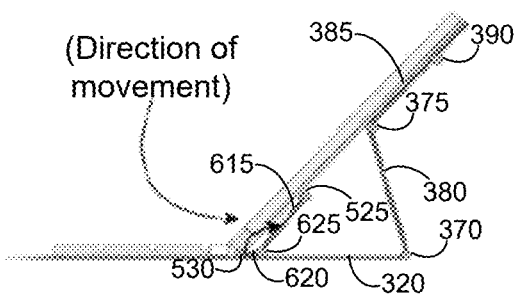
Figure 7C:
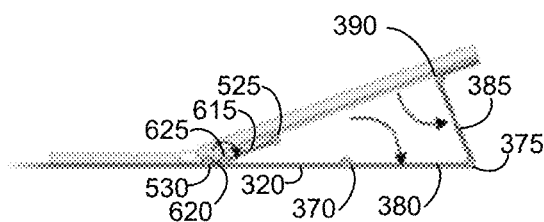

FIGS. 7A-C illustrate the transition of the device mount 300 from a folded configuration to raise the backplate 330 to various upright orientations, according to one example embodiment. As described above, in the folded configuration (e.g., the configuration illustrated in FIG. 4B), the backplate 330 rests on the lower support panel 340 and the upper support panel 335 at an orientation parallel to the bottom plate 320. The lower support panel 340 and the upper support panel 335 support the backplate 330 at an elevation above the keyboard 310 so that the backplate 330 does not contact the keyboard 310. Additionally, in the folded configuration, the backplate 330 covers the entire keyboard 310. When the backplate is raised to an upright orientation (e.g., the configurations illustrated in FIGS. 4C and 4D), the segments of the upper support panel 335 and the lower support panel 340 rotate about a system of hinges to raise backplate 330 to angles relative to the bottom plate 320. In addition to this angular rotation, the upper support panel 335 and the lower support panel 340 translate the backplate 330 in a lateral direction (away from the user) to expose the keyboard 310. Transitioning the backplate 330 from the folded configuration to an upright orientation is performed in two phases: raising the backplate 330 and orienting the backplate 330.

FIGS. 7A-C illustrate embodiments of the device mount 300 where the lower support panel is divided into two segments 615 and 620 with a medial hinge 625. However, a person of ordinary skill in the art would appreciate that the mechanical description of FIGS. 7A-C also apply to embodiments where the lower support is a single structure without a medial hinge 625.

FIG. 7A illustrates a backplate 330 being raised from a folded configuration to an upright orientation, according to one example embodiment. As described herein, the edge of the backplate 330 nearest the upper hinge 330 is also referred to as the top edge of the backplate 330. The edge of the backplate 330 nearest the second backplate hinge 565 is referred to as bottom edge of the backplate 330. From the folded configuration, a user may lift the top edge of the backplate 330 to raise the backplate 330 to an angle relative to the bottom plate 320 (e.g., any upright orientation). As the backplate 330 is raised, the lower segment 380 of the upper support panel 335 rotates about the first bottom plate hinge 370. The rotation of the lower segment 380 about the first bottom plate hinge 370 increases the angle between the lower segment 380 and the bottom plate 320. Accordingly, the lower segment 380 rotates away from the bottom plate 320 when the backplate 330 is raised to an upright orientation.

Simultaneously, as the top edge of the backplate 330 is lifted, components of the lower support panel 340 rotates about the second backplate hinge 525, the medial hinge 625, and the second bottom plate hinge 530. Recalling FIG. 6B, the upper segment 615 of the lower support panel 340 is parallel with the bottom plate 330 in the folded configuration. When the top edge of the backplate 330 is lifted, the upper segment 615 rotates about the medial hinge 625. The rotation of the upper segment about the medial hinge 625 increases the angle between upper segment 615 and the bottom plate 320. Accordingly, the upper segment 615 rotates away from the bottom plate 320 when the backplate 330 is raised to an upright orientation.

As the upper segment 615 rotates about the medial hinge 625, the backplate 330 rotates about the second backplate hinge 525. Recalling FIG. 6B, the backplate 330 rests on the first face of the upper segment 615 in the folded configuration. The upward rotation of the upper segment 615 raises the bottom edge of the backplate 330 from its resting position in contact with the first face of the upper segment 615. Accordingly, the rotation of the lower segment 380 of the upper support panel 334 about the first bottom plate hinge 370 and the rotation of the upper segment 615 of the lower support panel 340 about the medial hinge 625 translate the backplate 330 upwards.

The simultaneous rotation of the segments 380 and 615 raise the top edge of the backplate 330 higher than the bottom edge of the backplate 330, orienting the backplate 330 at an angle relative to the bottom plate, for example as illustrated in FIG. 6A. Further, as the rotation of the lower segment 380 of the upper support panel 335 raises the top edge of the backplate 330 higher than the bottom edge of the backplate, the backplate 330 rotates about the second backplate hinge 525. As the top edge of the backplate 330 is raised higher, the backplate 330 continues to rotate about the second backplate hinge 525 increasing the angle between the first face of the upper segment 615 and the backplate 330. Accordingly, rotation of the backplate 330 about the second backplate hinge 525 increases the distance between the first face of the upper segment 615 and the backplate 330.

When the top edge of the backplate 330 is raised past a critical elevation above the bottom plate 320, the bottom edge of the backplate 330 rotates towards the second face of the upper segment 615. Before the top edge of the backplate 330 reaches the critical elevation (e.g., as illustrated in FIG. 6A), the angle between the backplate 330 and the second face of the upper segment 615 is greater than the angle between the backplate 330 and the first face of the upper segment 615. When the top edge of the backplate 330 reaches the critical elevation, the angle between the backplate 330 and the second face of the upper segment 615 is equal (or nearly equivalent) to the angle between the backplate 330 and the first face of the upper segment 615. When the top edge of the backplate 330 is raised past the critical elevation, the angle between the backplate 330 and the second face of the upper segment 615 is less than the angle between the backplate 330 and the first face of the upper segment 615. The backplate 330 continues rotating about the second backplate hinge 525 until the bottom edge of the backplate 330 contacts the bottom plate 320. When the bottom edge of the backplate 330 contacts the bottom plate 320, the top edge of the backplate 330 is at its maximum elevation above the backplate 320.

When the top edge of the backplate 330 is raised past the critical elevation, the bottom edge of the backplate 330 continues rotating towards the second face of the upper segment 615 to orient the backplate 330. Recalling from FIG. 5B, the lower segment 620 is oriented perpendicular to the bottom plate 320 in the folded configuration. The rotation of the bottom edge of the backplate 330 towards the second face of the upper segment 615 causes the lower segment 620 to rotate about the second bottom plate hinge 530. The lower segment 620 rotates about the second bottom plate hinge 530 until the lower segment 620 is parallel with the bottom plate 320 and resting on top of the bottom plate 320. Accordingly, the lower segment 620 reaches the parallel orientation when the bottom edge of the backplate 330 contacts the bottom plate 320. At that point, the backplate 330 is secured in an upright orientation.

As discussed above, the device mount 300 may enable the backplate 330 to be adjusted to various upright orientations, for example a high elevation configuration and a low elevation configuration. The backplate 330 may be rotated between upright orientations by raising and lowering the top edge of the backplate 330. When the backplate 330 is adjusted between upright orientations, the upper segment 615 rotates about the medial hinge 625 to accommodate the various upright orientations. When the backplate 330 is adjusted from a higher elevation orientation to a lower elevation orientation, the upper segment 615 rotates about the medial hinge 625, reducing the angle between the first face of the upper segment 615 and the bottom plate 320. When the backplate 330 is adjusted from a lower elevation orientation to a higher elevation orientation, the upper segment 615 rotates about the medial hinge 625, increasing the angle between the first face of the upper segment 615 and the bottom plate 320. Although the angle between the upper segment 615 and the bottom plate 320 changes as the upper segment 615 rotates about the medial hinge 625, the upper segment 615 remains aligned with the backplate 330 in any upright orientation. The lower segment 620 remains parallel and in contact with the bottom plate 320.

As described above, some implementations of the device mount 300 comprise a lower support panel 340 that is only a single structure but includes no medial hinge, for example the device mount illustrated in FIGS. 3 and 4A-B. In such embodiments, the upper segment 385 and the lower segment 380 of the upper support panel 335 rotate about the first backplate hinge 390, the medial hinge 375, and the bottom plate hinge 370 in a manner functionally consistent with the above description of FIG. 7A. The lower support panel 340 is a single structure connecting the second backplate hinge 525 directly to the second bottom plate hinge 530. As the top edge of the backplate 330 is lifted, the lower support panel 340 rotates about the second bottom plate hinge 530 and the backplate 330 rotates about the second backplate hinge 525.

As described above, the upper support panel 340 rests at an angle relative to the bottom plate 320 to secure the backplate 330 in the folded configuration. When the top edge of the backplate 330 is lifted, the lower support panel 340 rotates about the second bottom plate hinge 530. The rotation of the lower support panel 340 about the second bottom plate hinge 530 increases the angle between the lower support panel 340 and the bottom plate 320. Accordingly, the lower support panel 340 rotates away from the bottom plate 320 when the backplate 330 is raised to an upright orientation.

As the lower support panel 340 rotates about the second backplate hinge 530, the backplate 330 rotates about the second backplate hinge 525. In the folded configuration, the second face of the lower support panel 315 is oriented downwards towards the bottom plate 320 while the first face 515 of the lower support panel is oriented upwards towards the backplate 330. The rotation of the lower support panel 340 away from the backplate 320 raises the bottom the bottom edge of the backplate 330 from its position in the folded configuration. Accordingly, the rotation of the lower segment 380 of the upper support panel 335 about the first bottom plate hinge 370 and the rotation of the lower support panel 340 about the second bottom plate hinge 530 translate the backplate 330 upwards from the folded configuration.

The backplate 330 continues to rotate about the second plate hinge 525 as the top edge of the backplate 330 is raised higher, which increases the angle between the first face 515 of the lower support panel and the backplate 330. As the top edge of the backplate 330 is raised higher, the backplate 330 continues to rotate about the second backplate hinge 525, increasing the angle between the first face 515 of the lower support panel 340 and the backplate 330. Accordingly, rotation of the backplate 330 about the second backplate hinge 525 increases the angle between the first face 515 of the lower support panel and the backplate 330.

When the top edge of the backplate 330 is raised past a critical elevation above the bottom plate 320, the bottom edge of the backplate 330 rotates towards the second face of the lower support panel 340. Before the top edge of the backplate 330 reaches the critical elevation (e.g., as illustrated in FIG. 6A), the angle between the backplate 330 and the second face of the lower support panel 340 is greater than the angle between the backplate 330 and the first face 515 of lower support panel 340. When the top edge of the backplate 330 reaches the critical elevation, the angle between the backplate 330 and the second face of the lower support panel 340 is equal (or nearly equivalent) to the angle between the backplate 330 and the first face 515 of the lower support panel 340. When the top edge of the backplate 330 is raised past the critical elevation, the angle between the backplate 330 and the second face of the lower support panel 340 is less than the angle between the backplate 330 and the first face of the lower support panel 340. The backplate 330 continues rotating about the second backplate hinge 525 until the bottom edge of the backplate 330 contacts the bottom plate 320. When the bottom edge of the backplate 330 contacts the bottom plate 320, the top edge of the backplate 330 is at its maximum elevation above the backplate 320.

When the top edge of the backplate 330 is raised past the critical elevation, the bottom edge of the backplate 330 continues rotating towards the second face of the lower support panel 340 until it makes contact with the second face of the lower support panel 340. When the backplate 330 is adjusted between upright orientations, the lower support panel 340 rotates about the second backplate hinge 530 to accommodate the various upright orientations. When the backplate 330 is adjusted from a higher elevation orientation to a lower elevation orientation, the lower support panel 340 rotates about the second bottom plate hinge 530, reducing the angle between the first face 515 of the lower support panel 340 and the bottom plate 320. When the backplate 330 is adjusted from a lower elevation orientation to a higher elevation orientation, the lower support panel 340 rotates about the second bottom plate hinge 530, increasing the angle between the first face 515 of the lower support panel 340 and the bottom plate 320. Although the angle between the lower support panel 340 and the bottom plate 320 changes as the lower support panel 340 rotates about the second bottom plate hinge 530, the lower support panel 340 remains aligned with the backplate 330 in any upright orientation.

FIG. 7B illustrates the transition of the backplate 330 into a high elevation configuration, according to one example embodiment. In the high elevation configuration (illustrated in FIG. 7B), the upper support panel 335 supports the backplate 330 at a higher angle relative to the bottom plate 320 compared to the low elevation configuration (illustrated in FIG. 7C). When the device mount 300 is positioned in the high elevation configuration, a user may interact with the display device 305 using the keyboard 310. In some embodiments, electronics within the spine 630 deactivate the contact-sensitive screen of the display device 305 in the high elevation configuration.

When the backplate 330 is adjusted between upright orientations, elements of the upper support panel 335 rotate about the first medial hinge 375, the first backplate hinge 390, and the first bottom plate hinge 370 to support the backplate 330 in a given upright orientation. When the backplate 330 is raised to a high elevation configuration, the upper segment 385 of the upper support panel 335 rotates about the first backplate hinge 390, reducing the angle between the backplate 330 and the upper segment 385 until the upper segment 385 is parallel with the backplate 330 (e.g., the upper segment 385 rests against the backplate 330). The upper segment 385 rotates about the first backplate hinge 375 until the upper segment 385 rests against the second surface 510 of the backplate 330.

As the upper segment 385 rotates about the first backplate hinge 390, both the upper segment 385 and the lower segment 365 rotate about the first medial hinge 375 to bend the upper support panel 335 at the first medial hinge 375. The rotation of the two segments 385 and 380 about the first medial hinge 375 causes the lower segment 380 to rotate about the first bottom plate hinge 370, reducing the angle between the lower segment 380 and the bottom plate 320. The rotation of the lower segment 380 about the first bottom plate hinge 370 rotates the lower segment 380 towards the bottom plate 320 until the first medial hinge 375 contacts the backplate 330. Accordingly, in the high elevation configuration, the upper support panel 335 bends to an orientation where the backplate 330 rests against the first medial hinge 375, establishing a point of the contact for the lower segment 380. Accordingly, the upper support panel 335 stabilizes the backplate 330 in the high elevation configuration between the first medial hinge 375 (in contact with the backplate 330) and the first bottom plate hinge 370 (in contact with the surface).

The device mount 300 may be adjusted from the high elevation configuration to the folded configuration (illustrated in FIG. 4B) by raising the bottom edge of the backplate 330. Raising the bottom edge of the backplate 330 causes the upper segment 385 to rotate about the first bottom plate hinge 370. The rotation of the upper segment 385 about the first bottom plate hinge 370 lifts the backplate 330 away from (and out of contact with) the upper segment 385. Additionally, raising the bottom edge of the backplate 330, causes the backplate 330 to rotate about the first backplate hinge 390. As the backplate 330 rotates about the first backplate hinge 390, the lower support panel 340 rotates about the second bottom plate hinge 530. As the lower support panel rotates about the second bottom plate hinge 530, the backplate 330 continues rotating about the second backplate hinge 525 until the backplate 330 rests against the first face 515 of the lower support panel.

The device mount 300 may be adjusted from the high elevation configuration illustrated in FIG. 7B to a low elevation configuration. FIG. 7C illustrates the transition of the backplate 330 to a low elevation configuration, according to one example embodiment. In the low elevation configuration, the, the upper support panel 335 supports the backplate 330 at a lower angle relative to the bottom plate 320 compared to the high elevation configuration (illustrated in FIG. 7B). When the device mount 300 is positioned in the lower elevation configuration, a user may interact with the display device 305 using the keyboard 310 and the contact-sensitive screen of the display device. In some embodiments, electronics within the spine 630 activate the contact-sensitive screen of the display device 305 while in the low elevation configuration mode.

To adjust the backplate 330 from a high elevation configuration to a low elevation configuration, a user lifts the top edge of the backplate 330. When the top edge of the backplate 330 is lifted, the upper segment 385 rotates about the first backplate hinge 510, increasing the angle (and distance) between the upper segment 385 and the backplate 330. The rotation of the upper segment 385 causes both the upper segment 385 and the lower segment 380 to rotate about the first medial hinge 375, bending the upper support panel 335 away from the backplate 330. As the upper support panel 335 bends at the first medial hinge 375 away from the backplate 330, the lower segment 380 rotates about the first bottom plate hinge 370. The lower segment 380 rotates about the first bottom plate hinge 370, increasing the angle between the lower segment 380 and the bottom plate 320 (e.g., the lower segment 380 rotates towards an orientation parallel with the bottom plate 320). The lower segment 380 rotates about the first bottom plate hinge 370 until the first medial hinge 375 rests against a surface on which the bottom plate 320 rests (e.g., parallel and in the same plane as the bottom plate 320). The rotation of the lower segment 380 about the first bottom plate hinge 370 rotates the lower segment 380 towards the surface until the first medial hinge 375 contacts the surface. Accordingly, the upper support panel 335 stabilizes the backplate 330 in the lower elevation configuration between the first medial hinge 375 (in contact with the surface) and the first backplate hinge 510 (in contact with the backplate 330).

Alternatively, the device mount 300 may be adjusted from the folded configuration directly to the low elevation configuration. When adjusted from the folded configuration, the bottom edge of the backplate 330 remains in contact with the bottom plate 320 while the top edge of the backplate 330 is rotated until the first medial hinge 375 contacts the surface as described above.

The device mount 300 may be adjusted from the high elevation configuration to the folded configuration (illustrated in FIG. 4B) by raising the bottom edge of the backplate 330. Raising the bottom edge of the backplate 330 causes the upper segment 385 to rotate about the first backplate hinge 390. The rotation of the upper segment 385 about the first backplate hinge 390 lifts the backplate 330 away from (out of contact with) the upper segment 385. Additionally, raising the bottom edge of the backplate 330 causes the backplate 330 to rotate about the second backplate hinge 525. As the backplate 330 rotates about the second backplate hinge 525, the lower support panel 340 rotates about the second bottom plate hinge 530 to an orientation where the second face of the lower support panel 340 is oriented downwards towards the bottom plate 320. The backplate 330 rotates about the second backplate hinge 525 to an orientation where the second surface of the backplate 330 faces the first surface 525 of the lower support panel.

Raising the bottom edge of the backplate 330 additionally causes the upper support panel 335 to rotate about the first medial hinge 375. The rotation of the upper support panel 335 about the first medial hinge 375 bends the upper support panel 335 towards the backplate 330. As the backplate 330 is folded into the folded configuration, the upper segment 385 rotates about the first backplate hinge 390 and the lower segment 380 rotates about the first bottom plate hinge 370 to reduce the angle between the upper segment 385 and the lower segment 380.

In some embodiments, upper support panel 335 and the lower support panel 340 may comprise additional rigid or semi-rigid elements (e.g., segments) coupled at additional hinges, which enable the device mount 300 to be folded to different upright orientations and configurations. Each element of the upper support panel 335 (e.g., the upper segment 385 and the lower segment 380) and the lower support panel 340 (e.g., the upper segment 615 and the lower segment 620) may comprise magnets or magnetic elements for securing the backplate 330 in any upright orientation or folded configuration.

Electric Terminals for Coupling a Display Device and a Keyboard

As described above, the display device 305 is a computing device with a contact-sensitive screen. Electronic elements within the display device 305 enable to functionalities and operation of the display device 305. The device mount 300 is a peripheral that offers additional functionality to a coupled display device 305. For example, the device mount 300 establishes an electrical connection between a coupled display device 305 and electronics 635 within the spine 630 of the device mount, while also allowing the device 305 to be folded to different configurations and protecting the device when not in use. Coupling the display device 305 to the backplate 330 establishes a non-permanent electrical connection between the display device 305 and the device mount 300.

FIGS. 8A-E illustrate side views of a detachable electrical connection between an input mechanism and a display device, according to one example embodiment. FIG. 7A illustrates a side view an electrical connection between the display device 305 and electronics in the device mount, according to one example embodiment. Conductive pins 805 within the spine 630 of the backplate 330 contact receptacles 810 on the edge of the display device 305 to establish an electrical connection between the display device 305 and the electronics 635 of the device mount 300. The electrical connection enables the display device 300 to receive signals encoded and transmitted by electronics 635 of the device mount 300 and the keyboard 310 when a user provides inputs to the keyboard. Accordingly, each conductive pin transmits a single informing the display device whether or not the keyboard is attached and ready to be used.

The conductive pin 805 may be described as part of or separate from the electronics 635 within the spine 630. One or more conductive pins 805 extend from the spine 630 towards the bottom edge of the display device 305. The body of each conductive pin 805 is at least partially housed within the spine 630 of the backplate 330, with the terminal of the conductive pin 805 extending through the spine 630 to face the display device 305. The conductive pin 805 may be mechanically flexible, so that the pin 805 may bend to accommodate the geometry or orientation of the coupled display device 305 but are initially aligned to be parallel with the backplate 330. The terminal of the conductive pin 805 may be a spring-loaded cylindrical pin (e.g., an H-shape spring or cylindrical spring), a torsion spring, electrically conductive foam, or any other material suitable for contacting receptacles 810 in the display device 305 and establishing an electrical connection between the electronics 635 and the device mount 300 and the display device 305. In some embodiments, the conductive pin 805 is soldered onto a circuit board that supports the electronics 635 within the spine 630.

The conductive pin 805 contacts one or more complementary receptacles 810 on the edge of the display device 305. In one embodiment, the receptacles 810 are circular electrodes that, when in contact with the conductive pin 805, enable the transmission of digital data and power between the display device 305 and electronics within the device mount 300. In one embodiment, the receptacles 810 are rigid, which allows that them to reliably interact with mechanically flexible conductive terminals, for example the flexible conductive pin 805.

Once the electrical connection between the display device 305 and the electronics 635 is established (by contact between the conductive pin 805 and the receptacle 810), the device mount maintains the electrical connection by securing the display device 305 against the spine 630. In some embodiments, backplate 330 comprises magnets for securing the display device 305.

Once the electrical connection between the display device 305 and the electronics 635 is established, the electronics 635 extend the connection to the keyboard 310 and additional sensors and electronics in the controller 640. The electrical connection enables electrical voltage and current to flow between the display device 305 and the keyboard 310 so that a user can operate both the display device 305 and the keyboard 310. The extended connection enables the electronics 635 to communicate signals generated by the controller 640 and encoded based on inputs to the keyboard 310 to the display device 305. In some embodiments, the electronics 635 within the spine 630 are electrically connected to the controller 640 by a conductor 815. In embodiments where the conductor 815 extends through the device mount across hinges that rotate as the device transition between various orientations and configurations, the conductor 815 is flexible to accommodate such changes in orientation and configuration. Examples of suitable conductors include, but are not limited to, conductive wires, conductive fabrics, or flexibly printed circuited boards.

Figure 8B:
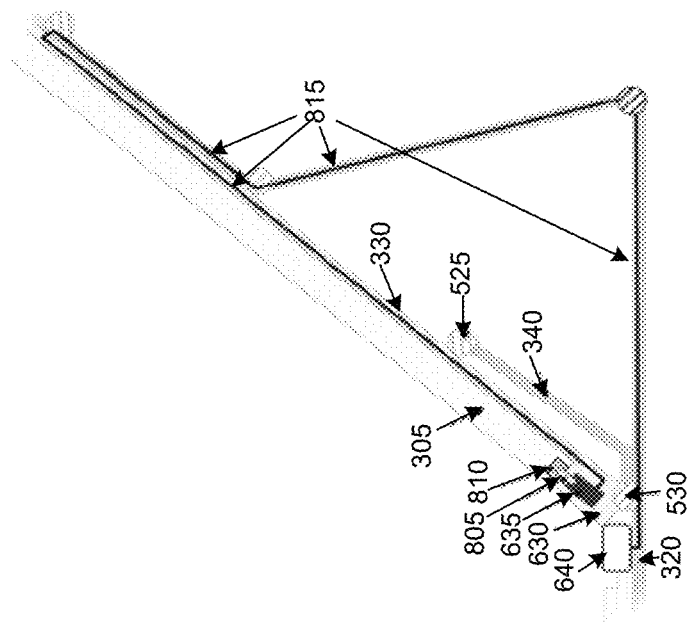
FIGS. 8A-F illustrate side views of a detachable electrical connection between an input device and a computing device, according to one example embodiment.
Figure 8A:
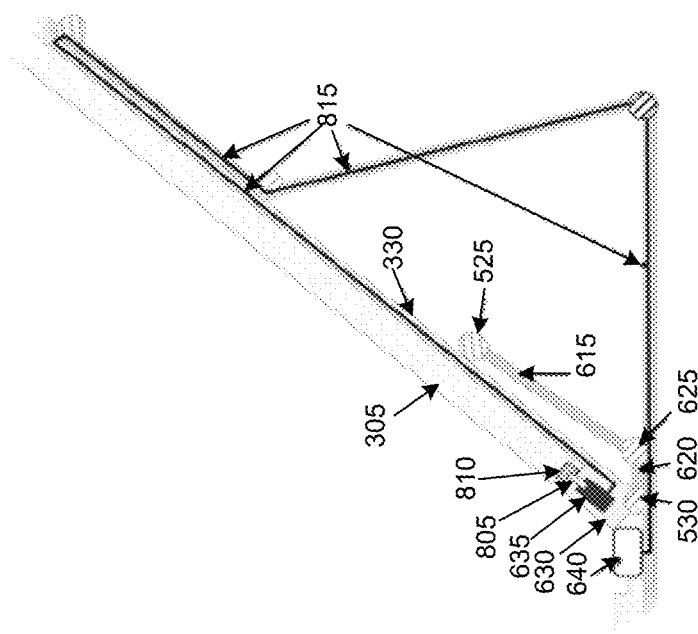

The device mount illustrated in FIG. 8A is the device mount illustrated and describe above with reference to FIGS. 5A-D and 6A-C. When the device mount is oriented in an upright configuration as illustrated in FIG. 7A, the receptacle 810 are in contact with the conductive pin 805 of the display device 300. The conductor 815 extends from the electronics 635 in the spine 630, through the backplate 330, through (or over) the first backplate hinge 510, through the upper segment 385 of the upper support panel 335, through (or over) the first medial hinge 375, through the lower segment 380 of the upper support panel 335, through (or over) the first bottom plate hinge 510, through the bottom plate 320, and into the controller 640. The conductor 815 may interface with the electronics 635 and the controller 575 by glue, lamination, conventional connectors, or any other suitable means.

As discussed above, the upper support panel 335 and the lower support pane 340 may each comprise a single rigid or semi-rigid segment or multiple (e.g., lower segments and upper segments). FIG. 8B illustrates a side view of an electrical connection between the display device and electronics in a device mount where the lower support panel 340 is a single structure, according to one example embodiment. The device mount illustrated in FIG. 8B is the device mount illustrated in FIGS. 3 and 4A-B. The conductor 815 extends along the same path described with reference to FIG. 8A. During the transition between the folded configuration and the upright orientation, upper support panel 335, lower support panel 340, and the backplate 330 rotate in manner consisted with the above description of FIGS. 7A-C.

Figure 8C:
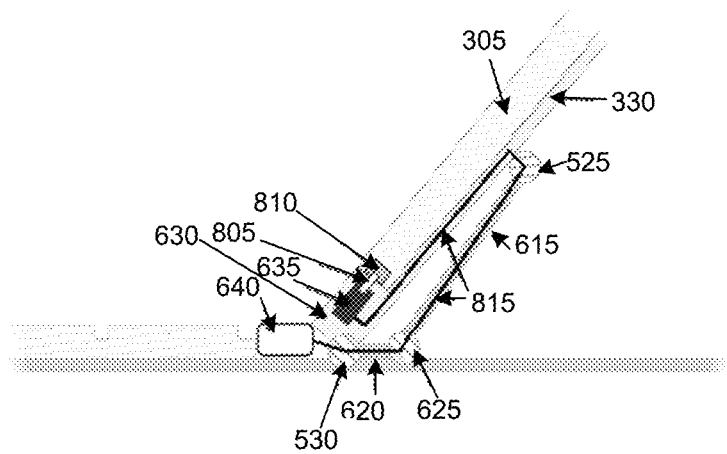

FIG. 8C illustrates a side view of an alternate electrical connection between the display device 305 and electronics in the device mount, according to one example embodiment. Compared to the conductor 815 in FIGS. 8A and 8B, the conductor 815 in FIG. 7C is shorter in length. The conductor 815 extends from the electronics 635 in the spine 630, through the backplate 330, through (or over) the second backplate hinge 525, through the upper segment 615 of the lower support panel 340, through (or over) the medial hinge 625, through the lower segment 620 of the lower support panel 340, through (or over) the second bottom plate hinge 530, and into the controller 640. In embodiments where the lower support panel 340 is a single segment, the conductor 815 travels through (or over) the second backplate hinge 566, through the lower support panel 340, and through (or over) the second bottom plate hinge 530.

Figure 8D:
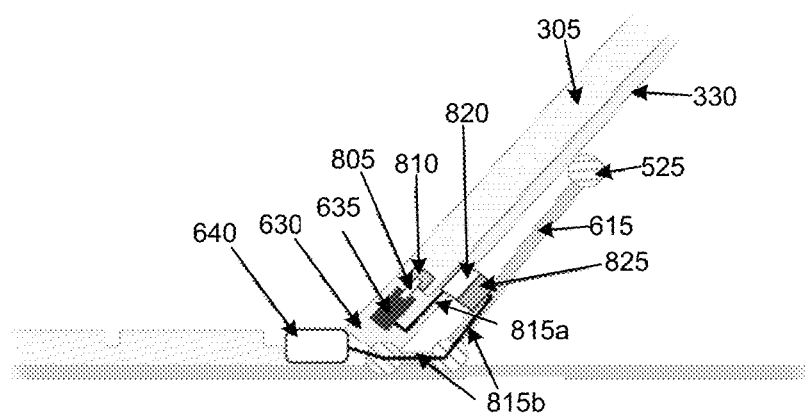

FIG. 8D illustrates a side view of an electrical connection between the display device 305 and electronics in the device mount established using complementary electrical contacts coupled to the backplate 330 and the lower support panel 340, according to one example embodiment. As illustrated in FIG. 8D, the conductor 815 is divided into two segments: 815a and 815b. The segment 815a of the conductor 815 connects the electronics 635 to an electrical contact 820 coupled to the second face of the backplate 330. The segment 815b of the conductor 815 extends from an electrical contact 825 coupled to the second face of the lower support panel 340, through the upper segment 615 of the lower support panel 340, through (or over) the second medial hinge 565, through the lower segment 620 of the lower support panel 340, through (or over) the second bottom plate hinge 530, and into the controller 640. In embodiments where the lower support panel 340 is a single structure, the segment 815b extends from the electrical contact 825, through lower support panel 340, through (or over) the second bottom plate hinge 530, and into the controller 640. In some embodiments, the electronics 635 within the spine 630 may be integrated into a circuit board that also integrates the electrical contact 825.

The electrical contacts 820 and 825 are each conductive contacts (e.g., springs) that establish an electrical connection between the segments 815a and 815b of the conductor 815. Accordingly, the electrical connection between the display device 305 and electronics of the device mount 305 is only established when the electrical contacts 820 and 825 are in direct contact. The electrical contacts 820 and 825 are brought into contact by the rotation of the backplate 330 from the folded configuration into an upright orientation. As a result, signals and power only flow between the controller 640 and the display device 305 when the backplate is supported in an upright orientation and the keyboard 310 is exposed to the user. The electrical contact 825 may be rigid or flexible and is secured on the second face of the lower support panel 340, for example using magnets. The electrical contact 825 may further include springs or conductive foam, which establishes an electrical connection when the electrical contacts 820 and 825 are in contact. The electric contact 820 may be rigid or flexible and is secured on the backplate 335, for example using magnets. The electric contact 820 may further include springs or conductive foam, which establishes an electrical connection when the electrical contacts 820 and 825 are in contact. To ensure production tolerances and that uneven materials do not impact performance of the electrical connection, at least one of the electrical contacts 820 and 825 are made of a flexible material. If either of the electrical contacts 820 and 825 are rigid or semi-rigid, the other contact 820 or 825 must be flexible.

In some embodiments, one of the electrical contacts 820 and 825 is a conductive pin 805 and the other is a complementary receptacle 810. Consistent with the description above, brining the contact (820 or 825) corresponding to the conductive pin 805 into contact with the other contact corresponding to the receptacle 810 establishes the electrical connection.

Figure 8E:
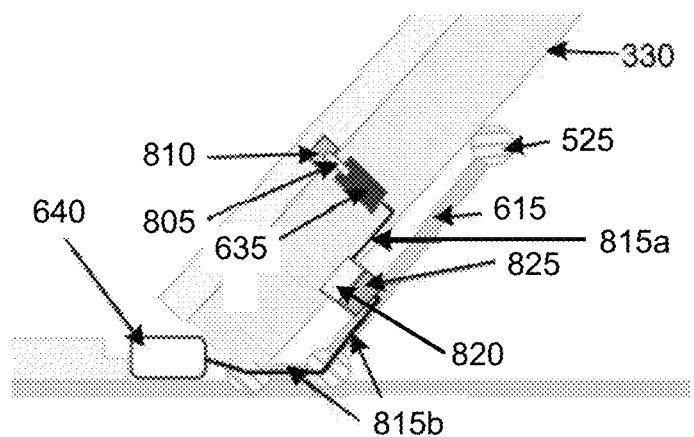

FIG. 8E illustrates a side view of an alternate electrical connection between the display device 305 and electronics in the device mount establishing using complementary electrical spring contacts, according to one example embodiment. Recalling the embodiments illustrated in FIGS. 8A-D, the conductive pin 805 extends from the spine 630 towards the bottom edge of the display device 305 at an angle parallel to the backplate 330. In such embodiments, the conductive pin 805 contacts a complementary receptacle 810 positioned on the edge of the display device 305. In the embodiment illustrated in FIG. 8E, the receptacle 810 is located on the rear face of the display device 305. The conductive pin 805 extends through the first surface of the backplate 330 at an angle perpendicular to the backplate 330. In the embodiment illustrated in FIG. 8E, the electrical connection is established when the rear face of the display device contacts the first surface of the backplate 330. A person of ordinary skill in the art would appreciate that conductive pins 805 may be positioned at any location on the backplate 330 that contacts the display device 305 when mounted and the complementary receptacles 810 may be positioned at complementary locations on the display device 305. Additionally, embodiments of the device mount 330 (not shown) may include multiple conductive pins 805 extending from various positions on the backplate 330 and both parallel and perpendicular to the backplate 330.

Consistent with the description in FIG. 8D, the conductor 815 divided into two segments: 815a and 815b. The segment 815a of the conductor 815 connects the electronics 635 to an electrical contact 820 coupled to the second face of the backplate 330. The segment 815b of the conductor 815 extends from an electrical contact 825 coupled to the second face of the lower support panel 340, through the upper segment 615 of the lower support panel 340, through (or over) the second medial hinge 565, through the lower segment 620 of the lower support panel 340, through (or over) the second bottom plate hinge 530, and into the controller 640. In embodiments where the lower support panel 340 is a single structure, the segment 815b extends from the electrical contact 825, through lower support panel 340, through (or over) the second bottom plate hinge 530, and into the controller 640.

Figure 8F:
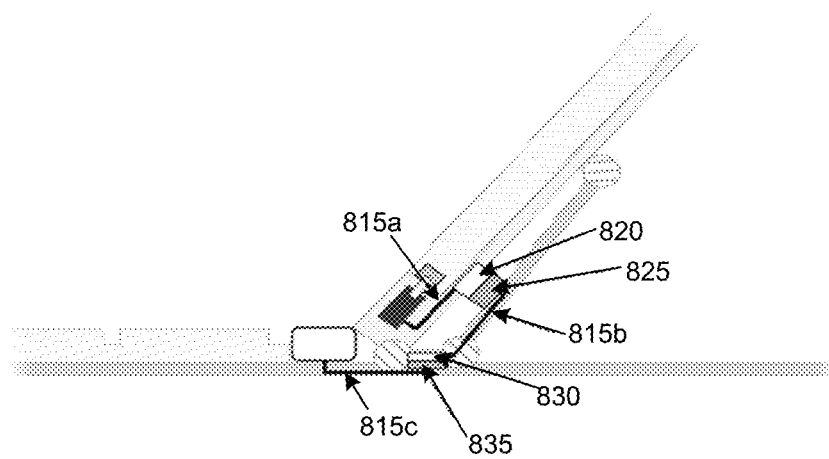

FIG. 8F illustrates a side view of an alternate electrical connection between the display device 305 and electronics in the device mount established using two pairs of electric terminals, according to one example embodiment. In the illustrated embodiment, the lower support panel 340 is separated into an upper segment 615 and a lower segment 620 by a medial hinge 625. The first set of electrical contacts 820 and 825 are inserted where the backplate 330 contacts the upper segment 615. A second set of electrical contacts 830 and 835 are inserted where the lower segment 620 contacts the bottom plate 320. The electric contact 830 is coupled to the lower segment 620 of the lower support panel 340 and the electric terminal 835 is coupled to the bottom plate 320. In some embodiments, the controller 640 or any other adjacent circuit boards are integrated into the bottom plate 320 to secure or form the electrical contact 835. The electrical contacts 830 and 835 are brought into contact by the rotation of the backplate 330 from the folded configuration to an upright orientation. The rotation of the backplate 330 causes the lower segment 620 to rotate as described above with reference to FIGS. 7A-C. As a result, signals and power only flow between the controller 640 and the display device 305 when the backplate is supported in an upright orientation and the keyboard 310 is exposed to the user. Each of the electrical contacts 830 and 835 are functionally and structurally consistent with the description above of the electrical contacts 820 and 825.

The conductor 815 is divided into three segments: 815a, 815b, and 815c. the segment 815a of the conductor 815 connects the electronics 635 to the electrical contact 820 coupled to the second face of the backplate 330. The segment 815b of the connector 815 connects the electrical contact 825 coupled to the second face of the lower support panel 340 to the electrical contact 830 coupled to the first face of the lower support panel 340. The segment 815c of the connector 825 connects the electrical contact 835 coupled to the bottom plate 320 to the to the controller 640. In the illustrate embodiment, the segments of the conductor 815 do not extend through (or over) any hinges of the device mount 300. Accordingly, the conductor 815 may be a flexible, rigid, or semi-rigid material in the illustrated embodiment of FIG. 8F.

Consistent with the description in FIG. 8D, the conductor 815 divided into two segments: 815a and 815b. The segment 815a of the conductor 815 connects the electronics 635 to an electrical contact 820 coupled to the second face of the backplate 330. The segment 815b of the conductor 815 extends from an electrical contact 825 coupled to the second face of the lower support panel 340, through the upper segment 615 of the lower support panel 340, through (or over) the second medial hinge 565, through the lower segment 620 of the lower support panel 340, through (or over) the second bottom plate hinge 530, and into the controller 640. In embodiments where the lower support panel 340 is a single structure, the segment 815b extends from the electrical contact 825, through lower support panel 340, through (or over) the second bottom plate hinge 530, and into the controller 640.

Figure 9:
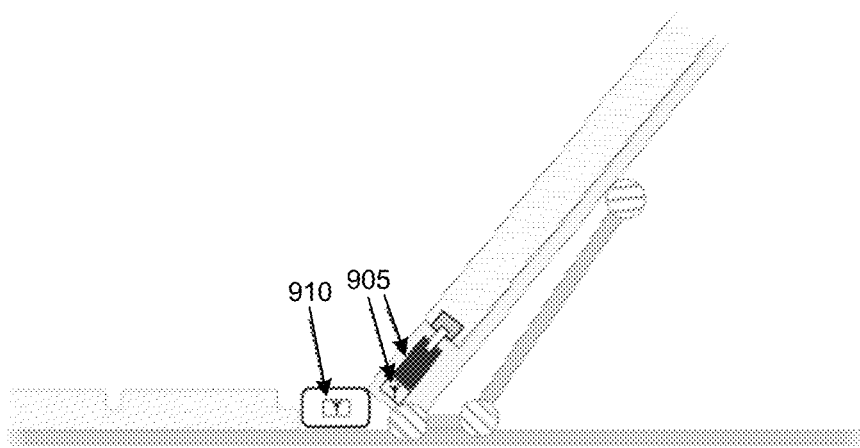
FIG. 9 illustrates a side view of a wireless connection between an input device and a computing device, according to one example embodiment.

FIG. 9 illustrates a side view of a wireless electrical connection between the display device 305 and electronics in the device mount, according to one embodiment. In the illustrated embodiment, a first NFC (near-field communication) wireless transceiver 905 is integrated into the spine 630. Additionally, a second NFC wireless transceiver 1010 is integrated into the controller 640. When the conductive pin 905 contacts the receptacle 1010 on the display device, the transceiver 905 establishes a wireless data connection with the transceiver 1010. In other embodiments, the transceiver 1010 may establish the wireless data connection with the transceiver 905 when the conductive pin 905 contacts the receptacle 1010.

Computing Machine Architecture

Figure 10:
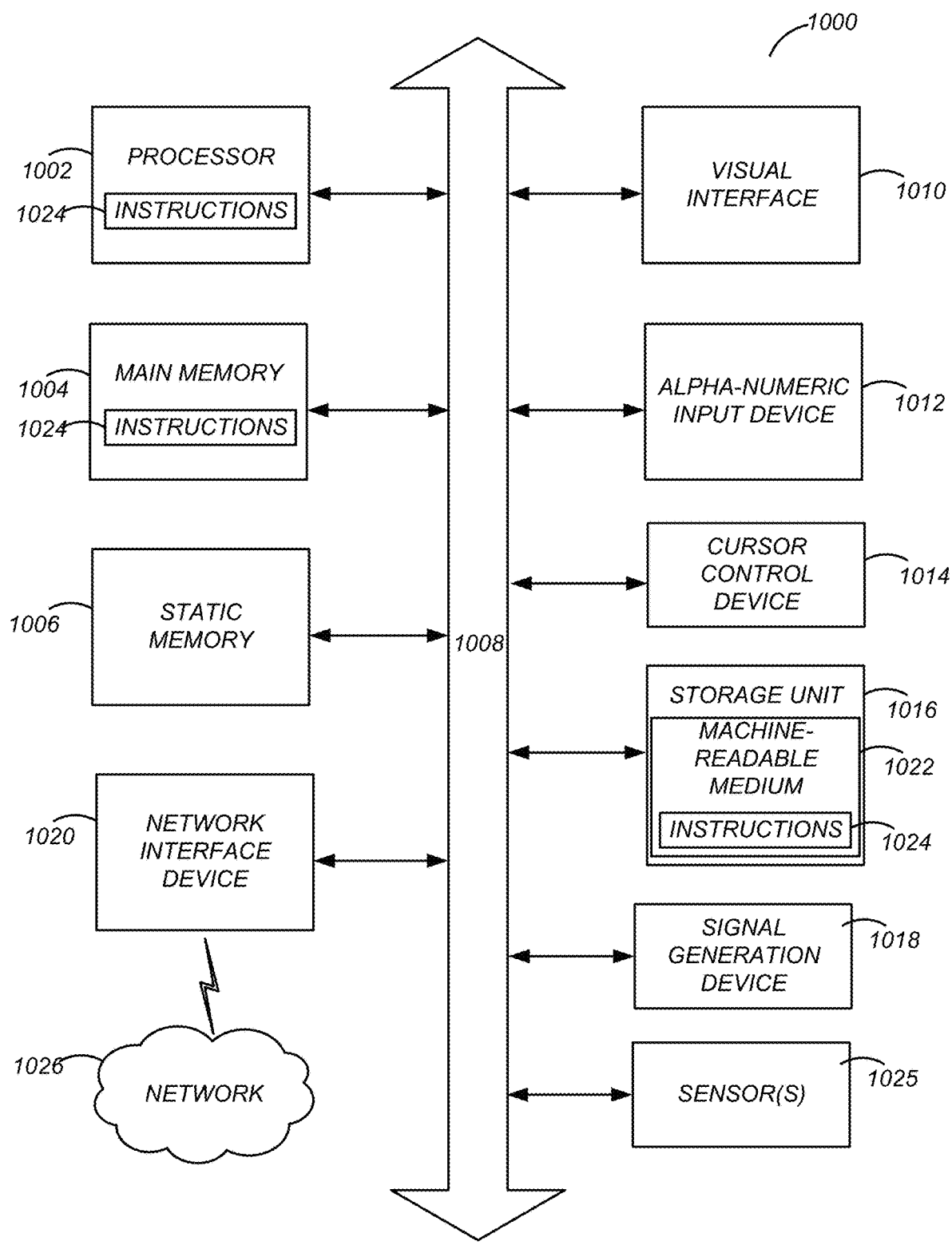
FIG. 10 is a block diagram illustrating components of an example machine able to read instructions from a machine-readable medium and execute them in a processor (or controller), according to one example embodiment.

FIG. 10 is a block diagram illustrating components of an example machine able to read instructions from a machine-readable medium and execute them in a processor (or controller), according to one embodiment. Specifically, FIG. 10 shows a diagrammatic representation of a machine in the example form of a computer system 1000 within which program code (e.g., software) for causing the machine to perform any one or more of the methodologies discussed herein may be executed. The display device 110 may include some or all of the components of the computer system 1000. The program code may be comprised of instructions 1024 executable by one or more processors 1002. In the display device 110, the instructions may correspond to some or all of the functional components described in FIGS. 1-9.

While the embodiments described herein are in the context of the display device 110, it is noted that the principles may apply to other touch sensitive devices. In those contexts, the machine of FIG. 10 may be a server computer, a client computer, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processors 1002 (e.g., a central processing unit (CPU), one or more graphics processing units (GPU), one or more digital signal processors (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include visual display interface 1010. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1010 may include or may interface with a touch enabled screen. The computer system 1000 may also include alphanumeric input device 1012 (e.g., a keyboard or touch screen keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 922 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

The computer system 1000 also may include the one or more sensors 1025. Also note that a computing device may include only a subset of the components illustrated and described with FIG. 10. For example, an IoT device may only include a processor 1002, a small storage unit 1016, a main memory 1004, a visual interface 1010, a network interface device 1020, and a sensor 1025.

Additional Considerations

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion.

For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A device mount for orienting a display device, the device mount comprising:
   a backplate having a first surface and a second surface, the first surface for removably coupling the display device;
   a bottom plate having a first surface comprising an input mechanism;
   an upper support panel comprising:
      a first hinge coupled to the second surface of the backplate; and
      a second hinge coupled to the bottom plate, the upper support panel rotatable about the first hinge and the second hinge to support the backplate as the backplate is raised relative to the bottom plate; and
   a lower support panel having a first face and a second face and comprising:
      a third hinge coupled to the second surface of the backplate, the backplate rotatable about the third hinge away from the first face of the lower support panel to rest against the second face of the lower support panel as the backplate is raised relative to the bottom plate; and
      a fourth hinge coupled to the bottom plate, the lower support panel rotatable about the third hinge and the fourth hinge as the backplate is raised relative to the bottom plate.

2. The device mount of claim 1, wherein the upper support panel comprises a first segment and a second segment, the first segment rotatable about the first hinge away from the backplate and the second segment rotatable about the second hinge away from the bottom plate as the backplate is raised to an upright orientation.

3. The device mount of claim 2, further comprising:
   a first medial hinge coupled to the first segment of the upper support panel and the second segment of the upper support panel, the first segment and the second segment rotatable about the first medial hinge to bend the upper support panel to support the backplate as the backplate is raised relative to the bottom plate.

4. The device mount of claim 2, wherein the second segment of the upper support panel is rotatable about the second hinge to orient the second segment at an angle relative to the bottom plate such that the second segment supports the backplate at a first angle relative to the bottom plate.

5. The device mount of claim 2, wherein the second segment of the upper support panel is rotatable about the second hinge to orient the second segment parallel with the backplate and the first segment of the upper support panel is rotatable about the first hinge to orient the first segment at an angle relative to the bottom plate such that the first segment supports the backplate at a second angle relative to the bottom plate.

6. The device mount of claim 1, further comprising:
   a second medial hinge coupled to a first segment of the lower support panel and a second segment of the lower support panel, the first segment of the lower support panel and the second segment of the lower support panel rotatable about the second medial hinge to support the backplate as the backplate is lowered relative to the bottom plate.

7. The device mount of claim 1, wherein the rotation of the backplate about the third hinge increases an angle between the backplate and the first face of the lower support panel and the backplate rotates about the third hinge until the backplate rests against the second face of the lower support panel as the backplate is raised relative to the bottom plate.

8. The device mount of claim 1, wherein the rotation of the backplate about the third hinge and the rotation of the lower support panel about the fourth hinge translates the backplate laterally as the backplate is lowered to an orientation parallel with the bottom plate, wherein the lateral translation positions the backplate to cover the input mechanism when parallel with the bottom plate.

9. The device mount of claim 8, wherein the upper support panel and lower support panel support the backplate when oriented parallel to the bottom plate such that the backplate covers the input mechanism.

10. The device mount of claim 1, further comprising:
    a screen cover rotatable about a cover hinge to cover the display device coupled to the backplate when the backplate is oriented parallel with the bottom plate.

11. A device mount for orienting a display device, the device mount comprising:
    a backplate having a first surface and a second surface, the first surface for removably coupling the display device;
    a bottom plate having a first surface comprising an input mechanism;
    an upper support panel comprising:
       a first hinge coupled to the second surface of the backplate;
       a second hinge coupled to the bottom plate, the upper support panel rotatable about the first hinge and the second hinge to support the backplate as the backplate is raised relative to the bottom plate; and
       a first medial hinge coupled to a first segment of the upper support panel and a second segment of the upper support panel, the first segment and the second segment rotatable about the first medial hinge to bend the upper support panel to support the backplate as the backplate is raised relative to the bottom plate; and
    a lower support panel having a first face and a second face and comprising:
       a third hinge coupled to the second surface of the backplate, the backplate rotatable about the third hinge away from the first face to rest against the second face as the backplate is raised relative to the bottom plate; and a fourth hinge coupled to the bottom plate, the lower support panel rotatable about the third hinge and the fourth hinge as the backplate is raised relative to the bottom plate and the backplate rotatable about the third hinge away from the first face of the lower support panel to rest against the second face of the lower support panel as the backplate is raised relative to the bottom plate.

12. The device mount of claim 11, wherein the first segment of the upper support panel is rotatable about the first hinge away from the backplate and the second segment of the upper support panel is rotatable about the second hinge away from the bottom plate as the backplate is raised to an upright orientation.

13. The device mount of claim 11, wherein the second segment of the upper support panel is rotatable about the second hinge to orient the second segment at an angle relative to the bottom plate such that the second segment supports the backplate at a first angle relative to the bottom plate.

14. The device mount of claim 11, wherein the second segment of the upper support panel is rotatable about the second hinge to orient the second segment parallel with the backplate and the first segment of the upper support panel is rotatable about the first hinge to orient the first segment at an angle relative to the bottom plate such that the first segment supports the backplate at a second angle relative to the bottom plate.

15. The device mount of claim 11, further comprising:
a second medial hinge coupled to a first segment of the lower support panel and a second segment of the lower support panel, the first segment of the lower support panel and the second segment of the lower support panel rotatable about the second medial hinge to support the backplate as the backplate is lowered relative to the bottom plate.

16. The device mount of claim 11, wherein the rotation of the backplate about the third hinge increases an angle between the backplate and the first face of the lower support panel and the backplate rotates about the third hinge until the backplate rests against the second face of the lower support panel as the backplate is raised relative to the bottom plate.

17. The device mount of claim 11, wherein the rotation of the backplate about the third hinge and the rotation of the lower support panel about the fourth hinge translates the backplate laterally as the backplate is lowered to an orientation parallel with the bottom plate, wherein the lateral translation positions the backplate to cover the input mechanism when parallel with the bottom plate.

18. The device mount of claim 17, wherein the upper support panel and lower support panel support the backplate when oriented parallel to the bottom plate such that the backplate covers the input mechanism.

19. The device mount of claim 11, further comprising:
a screen cover rotatable about cover hinge to cover the display device coupled to the backplate when the backplate is oriented parallel with the bottom plate.

20. An apparatus for securing a computing device, the apparatus comprising:
a bottom plate comprising an integrated keyboard positioned towards a first edge of the bottom plate;
a backplate for removably securing a computing device;
a first support panel coupled to the bottom plate and the backplate along a second end of the bottom plate, the second end of the bottom plate opposite the first edge of the bottom plate; and
a second support panel coupled to the bottom plate and the backplate at a central area of the backplate, the second support panel comprising:
a first hinge coupled to the backplate, the backplate rotatable about a first hinge away from a first face of the second support panel to rest against a second face of the second support panel as the backplate is raised relative to the bottom plate; and
a second hinge coupled to the bottom plate, the second support panel rotatable about the first hinge and the second hinge as the backplate is raised relative to the bottom plate.

* * * * *